(12) United States Patent
Xue et al.

(10) Patent No.: US 11,546,835 B2
(45) Date of Patent: Jan. 3, 2023

(54) CHANNEL OCCUPANCY MANAGEMENT OF NEW RADIO SIDELINK IN A STAR TOPOLOGY OF USER EQUIPMENT

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Ozcan Ozturk, San Diego, CA (US); Chih-Hao Liu, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 17/343,225

(22) Filed: Jun. 9, 2021

(65) Prior Publication Data
US 2022/0022125 A1    Jan. 20, 2022

Related U.S. Application Data

(60) Provisional application No. 63/052,224, filed on Jul. 15, 2020.

(51) Int. Cl.
*H04W 48/06*    (2009.01)
*H04L 41/12*    (2022.01)
*H04W 72/08*    (2009.01)

(52) U.S. Cl.
CPC ............ *H04W 48/06* (2013.01); *H04L 41/12* (2013.01); *H04W 72/085* (2013.01)

(58) Field of Classification Search
CPC ... H04L 41/0896; H04L 41/106; H04L 41/12; H04W 48/06; H04W 72/02; H04W 72/085
See application file for complete search history.

(56) References Cited

U.S. PATENT DOCUMENTS

2019/0124015 A1    4/2019    Loehr et al.
2020/0107330 A1    4/2020    Chae et al.
(Continued)

OTHER PUBLICATIONS

Interdigital, Inc., "Remaining Issues on Congestion control and QoS Management for NR-V2X" R1-2004297, 3 pages, May 25-Jun. 5, 2020. (Year: 2020).*

(Continued)

*Primary Examiner* — Pao Sinkantarakorn
(74) *Attorney, Agent, or Firm* — Haynes and Boone, LLP

(57) ABSTRACT

Wireless communications systems and methods related to channel occupancy management for new radio side-link supporting star topology of user equipment devices are provided. In some aspects, a user equipment (UE) determines a communication resources pool including a channel occupancy ratio (CR) gap of each UE of a plurality of UEs in communication with the first UE, a CR gap of each UE representing a difference between a CR limit of that UE and a CR of that UE, The UE also can communicate, to a second UE of the plurality of UEs, a first CR command configured to allow the second UE to access a first portion of the communication resources pool. In some aspects, an amount of the first portion can be different from an amount of the CR gap of the second UE in the communication resources pool.

30 Claims, 8 Drawing Sheets

(56) References Cited

U.S. PATENT DOCUMENTS

| | | | |
|---|---|---|---|
| 2020/0145867 A1 | 5/2020 | Tseng et al. | |
| 2021/0392547 A1* | 12/2021 | Tang | H04W 28/16 |
| 2022/0007369 A1* | 1/2022 | Zhao | H04W 72/0413 |
| 2022/0174695 A1* | 6/2022 | Lee | H04W 28/0247 |
| 2022/0224438 A1* | 7/2022 | Park | H04W 72/0453 |

OTHER PUBLICATIONS

International Search Report and Written Opinion—PCT/US2021/036875—ISA/EPO—dated Sep. 30, 2021.

* cited by examiner

CHANNEL OCCUPANCY MANAGEMENT OF NEW RADIO SIDELINK IN A STAR TOPOLOGY OF USER EQUIPMENT

CROSS-REFERENCE TO RELATED APPLICATIONS

The present application claims priority to and the benefit of the U.S. Provisional Patent Application No. 63/052,224, filed Jul. 15, 2020, titled "Channel Occupancy Management of New Radio Sidelink in a Star Topology of User Equipment," which is hereby incorporated by reference in its entirety as if fully set forth below and for all applicable purposes.

TECHNICAL FIELD

This application relates to wireless communication systems, and more particularly to channel occupancy management for new radio side-link supporting star topology of user equipment.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum. Additionally, NR sidelink may be extended to support applications in other domains, such as enhanced mobile broadband (eMBB), ultra-reliable low-latency communications (URLLC), etc.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects of the present disclosure, a method of wireless communication performed by a first user equipment (UE), includes determining a communication resources pool including a channel occupancy ratio (CR) gap of each UE of a plurality of UEs in communication with the first UE, a CR gap of each UE representing a difference between a CR limit of that UE and a CR of that UE. The method further comprises communicating, to a second UE of the plurality of UEs, a first CR command configured to allow the second UE to access a first portion of the communication resources pool. In some aspects, an amount of the first portion can be different from an amount of the CR gap of the second UE in the communication resources pool.

In some aspects, a method of wireless communication performed by a first user equipment (UE) of a plurality of UEs comprises communicating, to a second UE that is in communication with the plurality of UEs, a UE report including a CR gap of the first UE representing a difference between a CR limit of the first UE and a CR of the first UE. Further, the method comprises receiving, from the second UE, a first CR command configured to allow the first UE to access a first portion of a communication resources pool including the CR gap of the first UE. In some aspects, an amount of the first portion can be different from an amount of the CR gap of the first UE in the communication resources pool.

In some aspects, a first user equipment (UE) comprises a processor configured to determine a communication resources pool including a channel occupancy ratio (CR) gap of each UE of a plurality of UEs in communication with the first UE, a CR gap of each UE representing a difference between a CR limit of that UE and a CR of that UE. In some aspects, the first UE may comprise a transceiver configured to communicate, to a second UE of the plurality of UEs, a first CR command configured to allow the second UE to access a first portion of the communication resources pool. In some aspects, an amount of the first portion can be different from an amount of the CR gap of the second UE in the communication resources pool.

In some aspects, a first user equipment (UE) comprises a processor configured to communicate, to a second UE that is in communication with the plurality of UEs, a UE report including a CR gap of the first UE representing a difference between a CR limit of the first UE and a CR of the first UE. Further, the first UE may comprise a transceiver configured to receive, from the second UE, a first CR command configured to allow the first UE to access a first portion of a communication resources pool including the CR gap of the first UE. In some aspects, an amount of the first portion can be different from an amount of the CR gap of the first UE in the communication resources pool.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
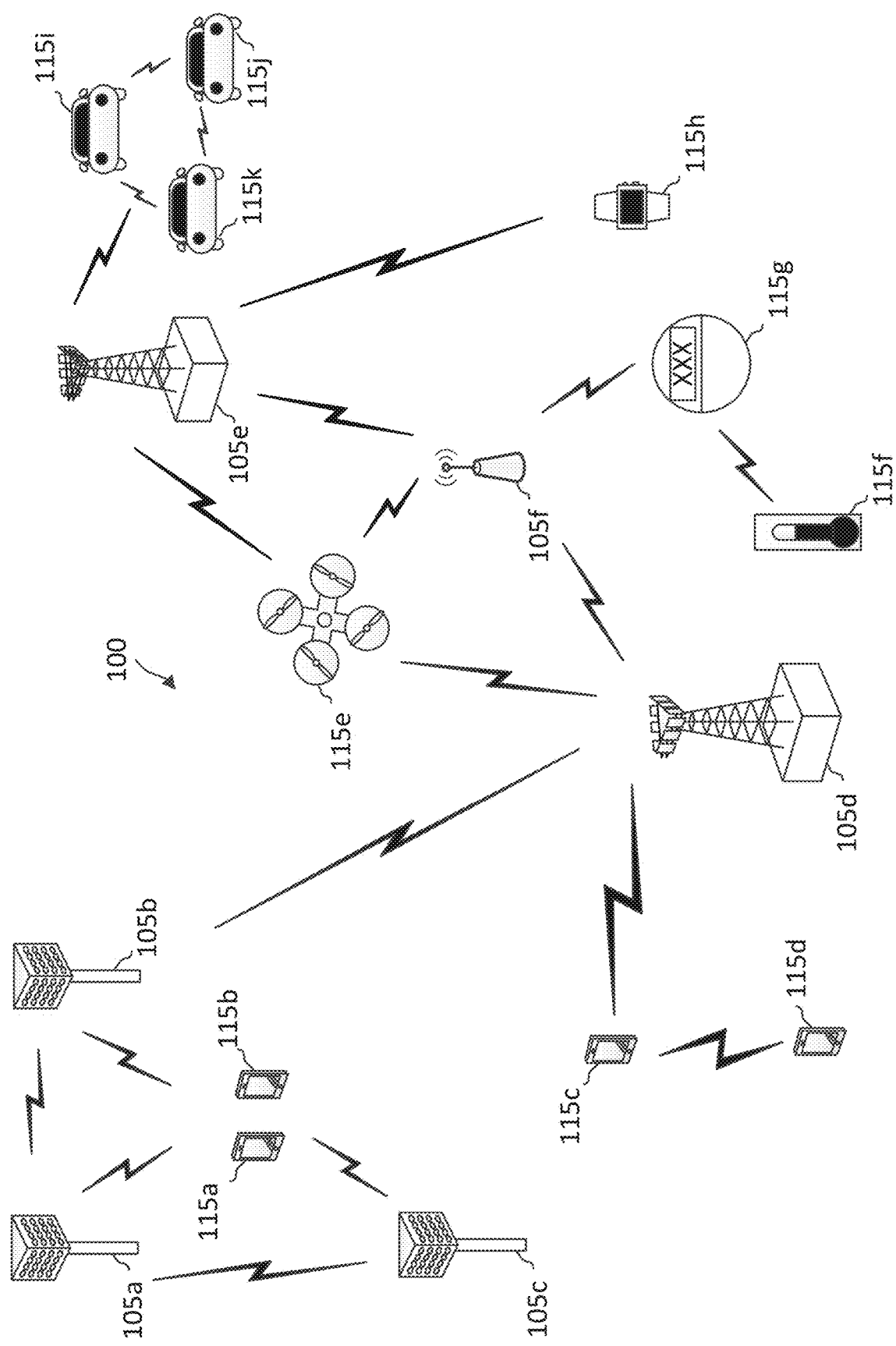
FIG. 1 illustrates a wireless communication network, according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including time-stringent control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Further, physical sidelink feedback channel (PSFCH) can be used to communicate hybrid automatic repeat request acknowledgment/negative acknowledgment (HARQ ACK/NACK) messages between the UEs (e.g., for reliable unicast). For instance, a sidelink receiver UE can transmit a sequence carrying a 1-bit HARQ response to a sidelink transmitter UE two slots later. Use cases for sidelink communication may include peer-to-peer communications and/or star topology networks/applications such as but not limited to V2X, intelligent transport systems (ITS), enhanced mobile broadband (eMBB), industrial IoT (IIoT), ultra-reliable low-latency communications (URLLC), NR-lite, and/or the like.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., next generation NodeB (gNB)) may determine a radio resource on behalf of a sidelink (SL) UE and transmit an indication of the radio resource to the SL UE. That is, a SL UE may receive grant from a gNB for channel access. The mode-2 RRA supports autonomous or standalone RRA where a SL peripheral UE, such as but not limited to out-of-coverage SL UEs or partial-coverage SL UEs, may conduct sensing to autonomously occupy or reserve channel access. A SL peripheral UE may be preconfigured with a sidelink resource pool and may select a radio resource from the preconfigured sidelink resource pool for sidelink communication. A distributed congestion control or quality of service mechanism may regulate at least aspects of channel access by SL UEs. For example, a distributed congestion control may specify a range of channel occupancy ratios (CRs) for a given channel busy ratio (CBR) (e.g., suitable for general sidelink applications) and specify a number of allowable retransmissions without reducing a transmit power. Each SL UE may measure its own CBR, which may be mapped to a CR limit to regulate the number of channel use within a sliding window of time. For this mode, it may be possible for sidelink systems to operate independent of a serving BS. A CBR is a metric indicating a number of subchannels (e.g., frequency subbands) in a sidelink resource pool with a measured receive signal strength indicator (RSSI) greater than a preconfigured threshold divided by the total number of subchannels in the resource pool. The CBR metric can be computed for a certain number of time intervals or subframes. The CBR can provide an estimation on the total state of the channel.

Besides peer-to-peer communications, NR use cases such as eMBB and URLLC employ star topology where a hub node (e.g., a SL hub UE) can serve as an information source, an information sink, or both to multiple peripheral nodes (e.g., SL peripheral UEs). That is, for example, within a star network, multiple peripheral UEs can transmit data to and/or receive data from a hub UE. The role of a hub UE or a peripheral UE may not be fixed in that a hub UE can become a peripheral UE, and vice versa, based on the traffic flow. Further, the traffic to/from peripheral UEs can be non-deterministic (e.g., fully random or with non-trivial jitter over a coarse pattern). In some cases, multiple star topology UE networks may share same resource pools (e.g., radio resource pools), and as such a single SCI can be used to occupy at least portions of said resource pools (e.g., subchannels). Further, as peripheral UEs tend to be powered by battery, star topology UE networks may be designed with power saving considerations.

Congestion/quality of service (QoS) management in star topology UE networks may include the UEs sensing the shared channel or resource and selecting which/how many sub-channels to use for communication based on the measurements or sensing. For example, a SL peripheral UE may measure a CRB and/or a CR of a channel to determine which and/or how many sub-channels the SL peripheral UE can use to transmit its data (e.g., to the SL hub UE). In some cases, the SL hub UE may be half-duplex constrained, i.e., may not transmit and receive data simultaneously, and in such cases, the SL peripheral UE may conduct blind re-transmissions to overcome the SL hub UE's half-duplex constraint. Such re-transmissions, however, may cause collisions among multiple SL peripheral UEs when each UE executes a multi-channel random access attempt in mode-2 RRA. In some cases, the SL hub UE may limit or prevent such collisions by coordinating reverse-link transmissions (TXs), i.e., by coordinating TXs from the SL peripheral UEs to the SL hub UE. For example, the SL hub UE may declare its schedule so that the half-duplex constraint may not affect the SL peripheral UEs. That is, the SL hub UE may announce to the SL peripheral UEs when and where the SL hub UE may be available for communication with the SL peripheral UEs, and as such the SL peripheral UEs may not have to conduct blind re-TXs due to the half-duplex constraint. As another example, the SL hub UE may have control over the manner of data transmission by the SL peripheral UEs. For example, the SL hub UE may poll the SL peripheral UEs to determine which SL peripheral UEs have data for transmission and issue transmission commands to these SL peripheral UEs to coordinate the reverse direction transmissions for higher efficiency.

In some aspects, the limit to the CR of a SL peripheral UE, i.e., the CR limit, may depend on the CBR measured by the same SL peripheral UE. For example, as the CBR increases, in some cases, the CR limit may decrease. Further, for the same CBR, a transmission or traffic that has higher priority may have higher CR limit compared to a transmission or traffic that has lower priority. In some cases, CBR and CR limit associated with a TX resource pool (e.g., and the relationship between the two parameters) may be preconfigured or configured via a radio resource control (RRC) message. As CR limits are applied on per-UE basis, in some cases, a SL peripheral UE that is transmitting when data traffic is high in the star topology UE network (i.e., during a "hot" traffic arrival period) may reach or hit its CR limit and be forced to refrain from communicating, resulting in larger latency and excessive power consumption, while another SL peripheral UE in the same star topology network may not have reached its CR limit, i.e., have CR "headroom". As such, there is a desire to provide a more efficient management of channel occupancy for new radio (NR) sidelink (SL) supporting star topology of user equipment devices (UEs).

The present application describes mechanisms for efficient channel occupancy management for NR SL in a star topology network of UEs. For example, in some aspects, the CR limits of SL peripheral UEs of a star topology network of UEs can be pooled and distributed among the SL peripheral UEs for more efficient communications, which can be particularly beneficial when the traffic arrivals at the SL peripheral UEs may be non-correlated. In some aspects, a SL hub UE of a star topology network of UEs can maintain a dynamic CR limit pool for the SL peripheral UEs associated with the star topology. In such cases, the SL hub UE may control that the sum of the channel occupancy of the SL peripheral units may not exceed the pooled CR limit, i.e., the sum of the channel occupancy of the SL peripheral units may not exceed the sum of the CR limits of the SL peripheral UEs. Further, the SL hub UE may grant from the pooled CR limit dynamic adjustments or tokens to the SL peripheral UEs to access more resources or sub-channels than specified by the CR limits of the respective SL peripheral UEs.

In some aspects, dynamic adjustments of CR limits of SL peripheral UEs can be implemented in mode-1 RRA. For example, SL UEs can report to the serving gNB the CBR measurements of the respective UEs, and the gNB may pool the CR limits (i.e., the gaps between the CR limits and the CR of SL peripheral UEs) and allocate the pooled resources to the UEs as discussed above. For instance, the gNB may issue grants of the pooled resources to the UEs via SCIs (e.g., downlink control information (DCI) 3-0 messages). In some aspects, mode-2 RRA implementation of dynamic adjustment of CR limits of SL peripheral UEs may be more advantageous compared to mode-1 RRA implementation as the DCI 3-0 type SCI in the latter can have high signaling overhead as well as can cause implementation complexities with respect to having meaningful gap from the SL hub UE to the gNB. For example, mode-2 allows for autonomous transmissions by SL peripheral UEs (i.e., SL peripheral UEs select the sub-channels or resources for the transmissions), which enhance system latency, lowered power consumption, reduced signaling overhead (e.g., which is in particular beneficial for supporting massive capacity), etc.

Aspects of the present disclosure can provide several benefits. In some aspects, allowing dynamic adjustments of CR of SL peripheral UEs may reduce or limit channel congestion, reduce UE latency and improve quality of service and power consumption. With reference to a non-limiting example of two SL peripheral UEs in a star topology network of UEs, a SL hub UE may allocate the spare CR or communication resources of one SL peripheral UE to another SL peripheral UE that is in need of additional CR, thereby allowing the latter SL peripheral UE to access at least a portion of the CR of the former. Such an adjustment may improve the latency and power consumption of the latter SL peripheral UE as its transmission can occur without waiting for channel or resource availability. Further, as the SL hub UE may regulate transmissions by SL peripheral UEs, channel congestion may be reduced or limited, and as such QoS may improve.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support time stringent communications with ultra-reliable and redundant links for time stringent devices, such as the UE 115e, which may be an unmanned vehicle/aircraft. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs)

and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (e.g., RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (e.g., PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may support sidelink communication among the UEs 115 over a shared radio frequency band (e.g., in a shared spectrum or an unlicensed spectrum). In some aspects, the UEs 115 may communicate with each other over a 2.4 GHz unlicensed band, which may be shared by multiple network operating entities using various radio access technologies (RATs) such as NR-U, WiFi, and/or licensed-assisted access (LAA). In some other aspects, the network 100 may support sidelink communication among the UEs 115 in a licensed frequency band.

In some aspects, a UE 115 may be part of a network of UEs in a star topology (e.g., a network including 115k, 115j and 115i). That is, a UE 115 can be a SL hub UE serving as an information source, an information sink, or both to multiple SL peripheral UEs. In some cases, the same UE 115 can also be a SL peripheral UE (e.g., in the same or different star topology network of UEs. Each SL peripheral UE 115 of a star topology network of UEs may measure channel occupancy headroom (i.e., available CR as specified by the CR limit of the SL peripheral UE) and report the same to a SL hub UE, which may pool the reported resources or CRs and distribute the same among the SL peripheral UEs while ascertaining that the total sum of the channel occupancy of the SL peripheral units may not exceed the pooled resources. Mechanisms for such dynamic adjustment of CR available for a SL peripheral UE of a star topology network of UEs are described in greater detail herein.

Figure 2:
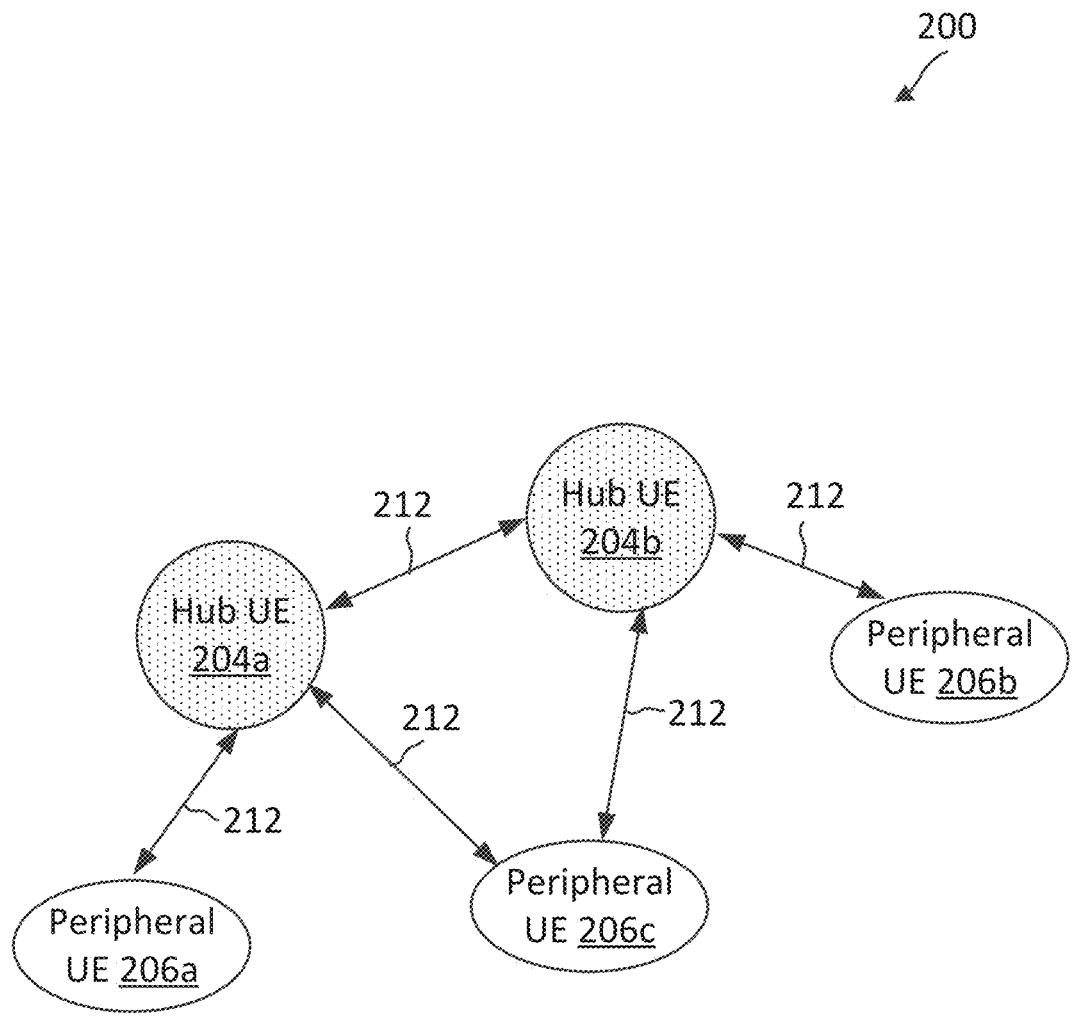
FIG. 2 illustrates a star topology deployment of user equipment (UE) network, according to some aspects of the present disclosure.

FIG. 2 illustrates a star topology deployment of UE network, according to some aspects of the present disclosure. The star topology deployment 200 of a network of UEs may correspond to a portion of the network 100. The star topology deployment 200 includes a plurality of SL hub UEs 204 (shown as 204a and 204b) and a plurality of SL peripheral UEs 206 (shown as 206a, 206b, 206c and 206d) as part of a star topology network of UEs 200. Although the star topology deployment 200 is illustrated with two SL hub UEs 204 and four SL peripheral UEs 206, it should be understood in other examples a star topology deployment of a network of UEs can include any suitable number of SL hub UEs 204 (e.g., 1, 3, 4, 5, 6 or more) and any suitable number of SL peripheral UEs 206 (e.g., 1, 2, 3, 5, 6, 7, 8, 9, 10 or more). The SL hub UEs 204 and the SL peripheral UEs 206 may correspond to UEs 115 in the network 100. The SL hub UEs 204 and/or the SL peripheral UEs 206 may be UEs that are equipped with wireless communication devices. In an IIOT setting, the S/A UEs 206 may be machines, industrial equipment, robots, sensors, actuators, and/or the like equipped with wireless communication devices. The SL hub UEs 204 may control the operations of the S/A UEs 206, for example, by sending control commands (e.g., SCIs) to the SL peripheral UEs 206. The SL hub UEs 204 may also read data, record, and/or measurements from the SL peripheral UEs 206. The communication between the SL hub UEs 206 and the SL peripheral UEs 204 may be over wireless channels (e.g., the sidelink 212). In some cases, the roles of a SL hub and a SL peripheral UE may not be fixed and may be determined by the flow of data traffic. For example, a different star topology network of UEs where the SL hub UE serves as an information sink may have UE 206c as a SL hub UE of the network when data traffic is flowing from UE 204a, 204b and 206a into UE 206c. In such cases, the rest of the UEs (i.e., 204a, 204b, 206a, 206b) may serve as SL peripheral UEs.

In some aspects, multiple SL peripheral UEs 206a, 206c, 206d may report to the SL hub UE via the sidelink 212 about the CR headroom the SL peripheral UEs 206a, 206c, 206d may have. In some cases, the CR headroom refers to the gap between a SL peripheral UE's CR and CR limit, which the SL hub UE 204a may pool to in turn distribute to the SL peripheral UEs 206a, 206c, 206d to improve latency, power performance of the peripheral UEs, etc. The SL hub UE 204a may distribute the pooled resources via the sidelink 212 while checking that the SL peripheral UE's channel occupancy does not exceed the amount of pooled resources.

Figure 3B:
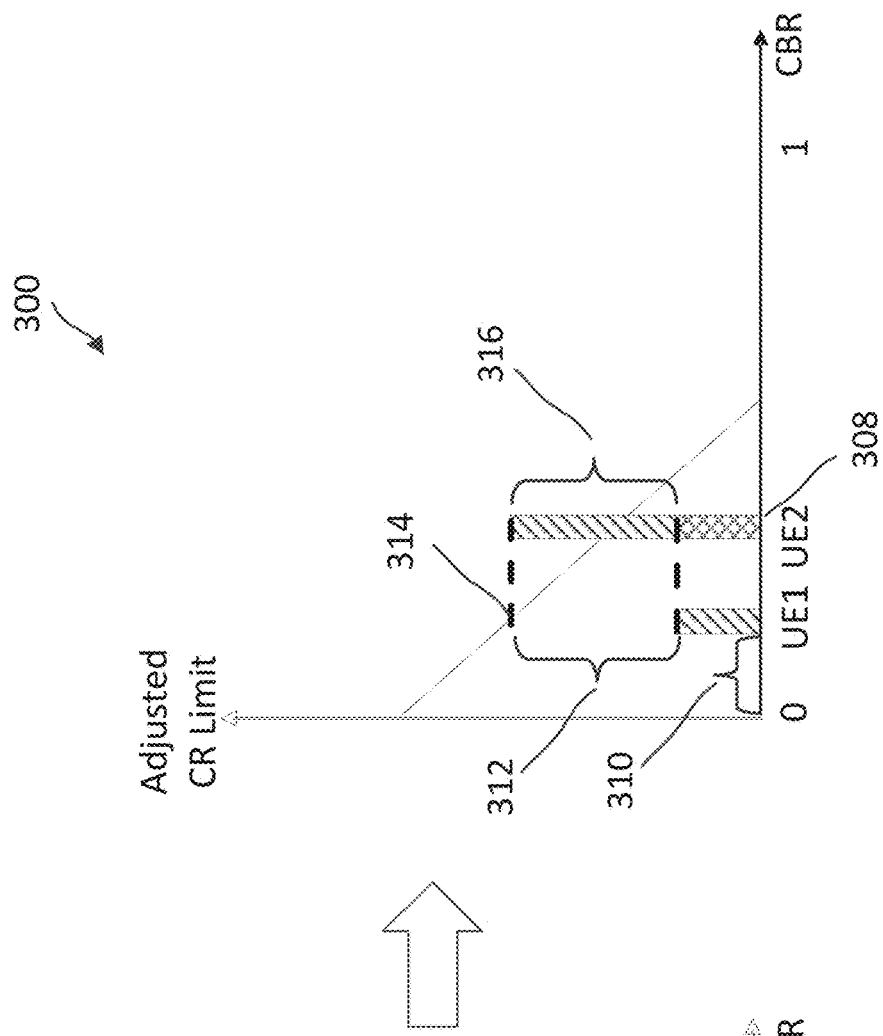
FIGS. 3A-3B illustrate a dynamic adjustment of channel occupancy ratio (CR) limit of a UE, according to some aspects of the present disclosure.
Figure 3A:
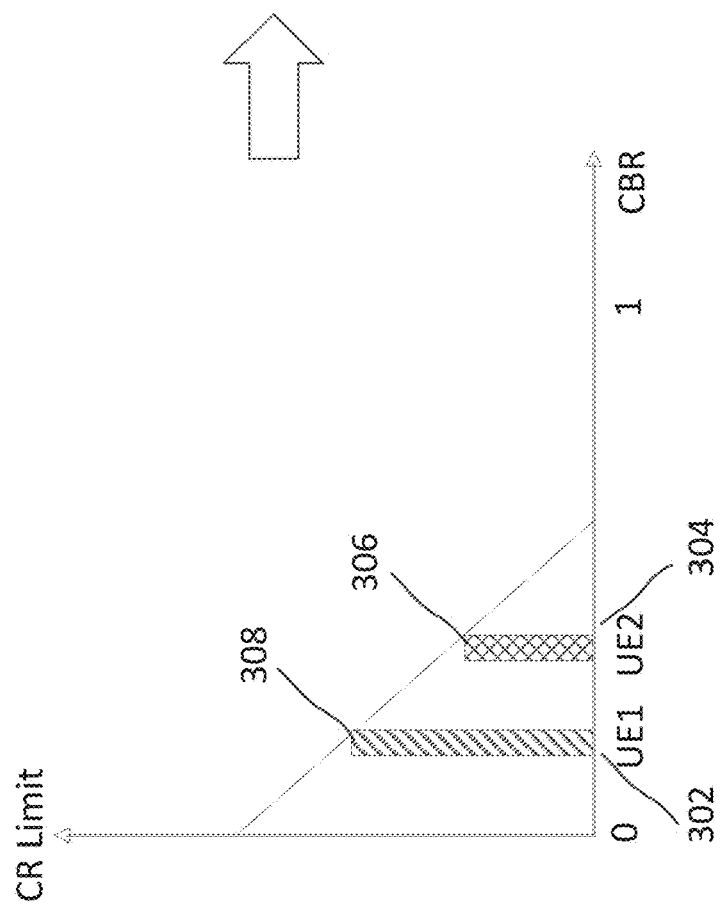

FIGS. 3A-3B illustrate a dynamic CR limit adjustment of a UE by pooling the CR gaps of multiple UEs of a star topology network of UEs, according to some aspects of the present disclosure. Although dynamic CR limit adjustment is illustrated with two SL peripheral UEs UE1 and UE2, it should be understood in other examples dynamic CR limit adjustment can be implemented with any suitable number of SL peripheral UEs (e.g., 3, 4, 5, 6, 7, 8, 9, 10 or more). In some aspects, a first sidelink peripheral UE (UE1) and a second sidelink peripheral UE (UE2) may be SL peripheral UEs that are part of or associate with a star topology network of UEs with a SL hub UE (e.g., the SL peripheral UEs 206a and 206c in the star topology UE network with the SL hub UE 204a). In some aspects, such star topology network of UEs may utilize a CBR and/or a CR to control when a sidelink UE (e.g., UE1 or UE2) may occupy a channel and how often the sidelink UE (e.g., UE1 or UE2) may occupy the channel (e.g., for intra-network or system collision control). A CBR is a metric indicating a number of subchannels (e.g., frequency subbands) in a sidelink resource pool (e.g., the resource pooled from the sidelink peripheral UEs of the star topology network) with a measured receive signal strength indicator (RSSI) greater than a preconfigured threshold divided by the total number of subchannels in the resource pool. The CBR metric can be computed for a certain number of time intervals or subframes. The CBR can provide an estimation on the total state of the channel. In some instances, a sidelink peripheral may compute a CBR by measuring RSSI in the subchannels within the resource pool over a time interval including a number of subframes (e.g., about 100), counting the number of subchannels with an RSSI above the preconfigured threshold in the time interval (e.g., a subchannel count), and dividing the subchannel count by the total number of subchannels in the resource pool.

A CR is a metric indicating a number of subchannels (e.g., frequency subbands) occupied by a sidelink UE for transmission divided by a total number of subchannels in the resource pool. The CR metric can be computed for a certain number of time intervals or subframes (e.g., sidelink frames). The CR can provide an indication of channel utilization by the sidelink UE. In some instances, a sidelink UE may compute a CR by counting a number of subchannels in the resource pool where the sidelink UE has an active transmission (e.g., a subchannel count) over a time interval and dividing the subchannel count by the total number of subchannels in the resource pool. In some cases, a CR may be calculated at subframe n, and it may be defined as the total number of subchannels used for its transmissions in subframes [n−a, n−1] and granted in subframes [n, n+b] divided by the total number of subchannels within [n−a, n+b]. The parameters a and b may be determined with the limitation of a+b+1=1000, where a≥500. The CR can provide an indication on the channel utilization of a SL peripheral UE. In some aspects, for each interval of CBR values, a CR limit may be defined as a footprint that the SL peripheral UE should not exceed. When the SL peripheral UE transmits a packet, it may map its CBR value to the correct interval to get the corresponding CR limit value. If its CR is higher than the CR limit, then the SL peripheral UE may have to decrease its CR below that limit. Some aspects of congestion control mechanisms in intelligent transport systems (ITS) are discussed in the ETSI standard document TS 103 574 V1.1.1, titled "Intelligent Transport Systems (ITS); Congestion Control Mechanisms for the C-V2X PC5 interface; Access layer part", November, 2018, which is incorporated herein by reference in its entirety.

With reference to FIG. 3A, in some aspects, the first SL peripheral UE1 and the second SL peripheral UE2 may perform CBR measurements, i.e., compute CBR values by measuring RSSIs as discussed above, and determine a respective first CBR 302 and second CBR 304. FIG. 3A shows an example mapping of CBR values to CR limits, where a higher CBR 304 maps to a lower CR limit 306, compared to a lower CBR 302 that maps to a higher CR limit 308. In some cases, the CR of a UE can be lower than the CR limit, and in some cases, the channel occupancy needs of a UE can be more than what is specified by its associated CR limit. For example, the latter UE can be in a hot or heavy loading data traffic zone, and the channel occupancy need can be higher than its CR limit. As another example, a UE may have low traffic level, and as such the CR of the UE can be lower than the CR limit. In such cases, the first SL peripheral UE1 and second SL peripheral UE2 can report to the SL hub UE of the star topology UE network of which each is a part about the CR gaps or headroom, if any, between their respective CR and CR limits. For example, with reference to FIG. 4B, UE1 may report the CBR 310 and the CR gap 312, which may be determined from the CR limit 314 and the CR of the UE1 (i.e., the CR gap 312 can be calculated from the difference between the CR limit 314 and the CR of the UE). In some aspects, the CR limit may be determined from the CBR 310 (e.g., using the mapping in FIG. 3A showing the relationship or mapping between CBR and CR limits). In some aspects, a channel occupancy ratio (CR) gap of a SL peripheral UE may include sub-channels of the channel that are available for communication by the SL peripheral UE.

In such cases, the SL hub UE may pool the reported CR gaps or resources (e.g., sub-channels), and issue a command or permission to a SL peripheral UE (e.g., UE2) to allow UE2 to access a portion of the pooled resources. For example, the SL hub UE may issue a command adjusting the CR limit of the SL peripheral UE so that the same UE can access more pooled resources than would have been the case under its CR limit. In some aspects, the SL hub UE may issue tokens for use by a SL peripheral UE to access at least a portion of the pooled resources. In some cases, the amount of the portion may be different (i.e., greater or less) than the CR gap which the SL peripheral UE (e.g., UE2) contributed into the resource pool. FIG. 4A shows an example illustration of allowing a UE to access pooled resource (e.g., sub-channels) by adjusting the CR limit of the UE. The pooled resource includes the CR gap 312 of UE1, and the SL hub UE may issue a command allowing UE2 to access the pooled resource. For example, the SL hub UE may adjust (e.g., increase) the CR limit of UE2 so that UE2 may access a portion of the pooled resource 316 without exceeding its adjusted CR limit (e.g., while exceeding its pre-adjustment CR limit but remaining within its adjusted CR limit). In some aspects, instead of or in addition to adjusting the CR limit, the SL hub UE may provide the SL peripheral UE to access the pooled resources. In some aspects, the SL hub UE may ascertain that the sum of the pooled resources accessed by SL peripheral UEs may not exceed the total pooled resource (i.e., the sum of the portions of pooled resources equals the total amount of pooled resources). In some cases, the SL hub UE may set a positive margin where the sum of the pooled resources is less than the total amount of pooled resources by some positive margin. The SL hub UE may set such a margin to ascertain the SL peripheral UEs may not access more resources than available in the pooled resources. In some aspects, the margin may be set by the gNB of the network to which the SL hub UE is attached or connected, or the SL hub UE may be preconfigured to set the margin.

Figure 4:
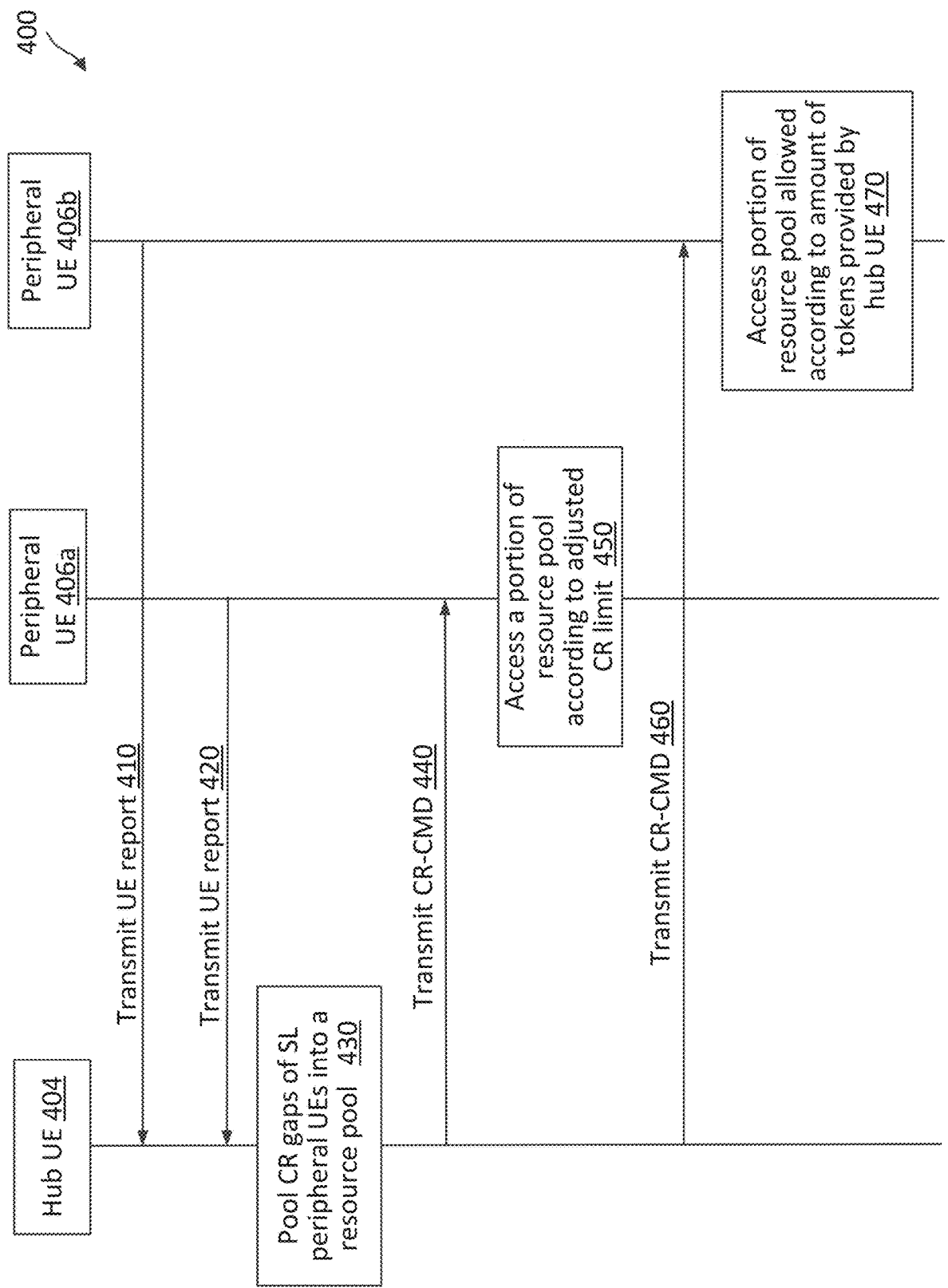
FIG. 4 is a signaling diagram illustrating channel occupancy management method for new radio star topology network of UEs, according to some aspects of the present disclosure.

FIG. 4 is a signaling diagram illustrating channel occupancy management method for new radio star topology network of UEs, according to some aspects of the present disclosure. The method 400 may be implemented in a star topology network of UES including at least one SL hub UE 404 and two SL peripheral UEs 406 (shown as 406a and 406b). The SL hub UE 404 and the SL peripheral UEs 406 may correspond to a SL hub UE 204 and SL peripheral UEs 206 in the star topology deployment of a network of UEs 200. Although the method 400 illustrates the SL hub UE 404 in communication with two SL peripheral UEs 406, it should be understood that in other examples the SL hub UE 404 may communicate with any suitable number of SL peripheral UEs 406 (e.g., about 2, 3, 4, 5, 6 or more). As illustrated, the method 400 includes a number of enumerated actions, but embodiments of the method 400 may include additional actions before, after, and in between the enumerated actions. In some embodiments, one or more of the enumerated actions may be omitted or performed in a different order.

At action 410, SL peripheral UE 406a transmits a UE report including at least a CR gap of the SL peripheral UE 406a (e.g., as discussed above). For example, SL peripheral UE 406a may measure or compute its CBR (e.g., compute a CBR value by measuring RSSI) as discussed above and determine the CR limit based on a mapping from CBR values to CR limits (e.g., based on a pre-specified or set mapping between CBR values and CR limits similar to FIG. 3A). In some aspects, the SL peripheral UE 406a may transmit the CBR, the CR limit and/or the CR gap (i.e., the CR headroom or available sub-channels between the CR limit and the CR of the SL peripheral UE) to the SL hub UE 404 as part of the UE report. In some aspects, the SL peripheral UE 406*a* may transmit the CBR and the CR limit and the SL hub UE 404 may determine SL peripheral UE's 406*a* CR gap based on the transmitted values. In some aspects, at action 420, the other SL peripheral UEs (e.g., such as SL peripheral UE 406*b*) in the star topology network of UEs that includes the SL hub UE 404 and SL peripheral UE 406*a* may also transmit to the SL hub UE 404 a UE report similar to the UE report transmitted to the SL hub UE 404 by SL peripheral UE 406*a*. In such cases, each report may include at least CBR, CR limit and/or CR gap of the respective SL peripheral UE.

In some aspects, a SL peripheral UE (e.g., 406*a* or 406*b*) may not transmit a UE report including the SL peripheral UE's CR, and the SL hub UE 404 may determine the SL peripheral UE's CR. For example, the SL peripheral UE may be a star topology dominating UE, i.e., a substantial amount (e.g., more than about 70%, about 80%, about 90%, including values and subranges therebetween) of the data traffic from the SL peripheral UE may be directed to the SL hub UE. In such cases, the SL hub UE may at least estimate or determine the CR of the SL peripheral UE by monitoring the data traffic from the SL peripheral UE. For example, the UE report from the SL peripheral UE to the SL hub UE may not include the CR (e.g., the report may include only the CBR), but the SL hub UE may determine the CR of the SL peripheral UE from monitoring the data traffic. In such cases, the SL peripheral UE may determine the CR limit from the CBR and transmit the same to the SL hub UE as part of the UE report. In some cases, the SL hub UE may determine the CR limit of the SL peripheral UE (e.g., based on the CBR transmitted by the SL peripheral UE as part of the UE report).

In some aspects, a SL peripheral UE may be identified by a SL hub UE as a star topology dominating UE (i.e., a star topology UE network dominating SL peripheral UE) when a measure of the data traffic from the SL peripheral UE to the SL hub UE (e.g., CR of the SL peripheral UE for data traffic to the SL hub) exceeds a threshold traffic level. For example, the measure of the traffic level may be defined as a ratio between a data traffic level from the SL peripheral UE to the SL hub UE and a total data traffic level from the SL peripheral UE to the SL hub UE and the other devices. As another example, the measure of the data traffic level may be defined as a ratio between the data traffic level from the SL peripheral UE to the SL hub UE and the data traffic level from the SL peripheral UE to the other devices. It is to be understood that the measure of the data traffic level may be defined in other ways that measure the level of data traffic from the SL peripheral UE to the SL hub UE. In such cases, when the measure of the data traffic level from a SL peripheral UE exceeds a threshold value of the data traffic level, then the SL hub UE may treat the SL peripheral level as a star topology dominating UE (i.e., as a SL peripheral UE dominating a star topology network of UEs). The SL hub UE may then at least estimate or determine the CR of the SL peripheral UE by monitoring the data traffic from the SL peripheral UE. In some aspects, the SL hub UE may not receive a UE report including the CR of the SL peripheral UE, but instead receive a UE report including the CBR of the SL peripheral UE, from which the SL hub UE can determine the CR of the SL peripheral UE. In some aspects, the threshold traffic level may be defined based on the priority class of the data traffic. That is, for example, the threshold traffic level ratio for identifying a SL peripheral UE as a star topology dominating SL peripheral UE may be different among different priority classes of the data traffic from the SL peripheral UE (e.g., to the SL hub UE or other devices). In some aspects, the SL hub UE may broadcast to the SL peripheral UEs of the star topology network the threshold traffic level for determining whether a SL peripheral UE qualifies as a star topology network dominating peripheral UE. For example, the SL hub UE may broadcast to the star topology a sidelink control information (SCI) message including the threshold traffic level.

In some aspects, the SL peripheral UE may report to the SL hub UE the data traffic from the SL peripheral UE to the SL hub UE as well as to other devices, and the SL hub UE may determine whether the SL peripheral UE is a star topology dominating SL peripheral UE by comparing the reported measure of data traffic level to a threshold traffic level. In some aspects, there may be a time interval associated with the SL hub UE determining the status of the SL peripheral UE (e.g., with respect to being a star topology dominating UE). That is, the SL peripheral UE may transmit a report of the data traffic level once during the time interval (e.g., as set by the SL hub UE), and the SL hub UE may make the determination based on the transmitted report. As discussed above, upon determining that the SL peripheral UE is a star topology dominating UE (i.e., after determining that a substantial amount of the data traffic from the SL peripheral UE is directed to the SL hub UE), the SL hub UE may determine the CR of the SL peripheral UE based on its monitoring or measurements and compute the CR gap of the SL peripheral UE.

In some aspects, to reduce overhead of CBR reporting by the SL peripheral UEs 406*a*, 406*b* and increase efficiency of the star topology network of UEs, the SL hub UE may broadcast to the UEs a baseline CBR value such that each SL peripheral UE may report only the difference between the SL peripheral UE's CBR measurement and the baseline CBR value (e.g., as opposed to reporting the CBR measurement). For example, each SL peripheral UE may include in its UE report the difference between the SL peripheral UE's CBR measurement and the baseline CBR value, and not the CBR measurement itself. In some cases, the SL peripheral UE may be configured to report the CBR difference only when the difference is a positive value, i.e., only when the CBR measurement exceeds the baseline value. In some cases, the SL peripheral UE may be configured to report the CBR difference only when the difference is not a positive value, i.e., only when the baseline value exceeds the CBR measurement. In some aspects, the SL hub UE may broadcast the baseline CBR value to the SL peripheral UEs of the star topology network via a sidelink control information (SCI) message including the baseline CBR value.

At action 430, in some aspects, the SL hub UE may pool the CR gaps of the SL peripheral UEs (e.g., 406*a*, 406*b*) reported by the respective UE reports of the SL peripheral UEs or calculated or determined by the SL hub UE based on CBR measurements from the UE reports. For example, as discussed above, one or more SL peripheral UEs of a star topology network of UEs may have reported to the SL hub UE about CR gap or headroom under the CR limit available for use by that SL peripheral UE (e.g., number of sub-channels of the channel unoccupied by the SL peripheral UE but allowed by the CR limit for use by the same). As another example, an SL peripheral UE may have reported its CBR measurement and the SL hub UE may have determined the CR gap of the SL peripheral UE (e.g., based on monitoring data traffic from the SL peripheral UE if the SL peripheral UE is determined to be a star topology dominating UE). In some aspects, the SL hub UE may pool these reported or determined CR gaps into a pooled resource for distribution to at least some of the SL peripheral UEs of the star topology network of UEs. For example, the pooled resources may include a total number of unoccupied sub-channels of the channel pooled from one or more SL peripheral UEs of the star topology network of UEs.

At action 440, in some aspects, the SL hub UE 404 may transmit a channel occupancy ratio-command (CR-CMD) to one or more SL peripheral UEs (e.g., SL peripheral UE 406a) allowing SL peripheral UE 406a to access at least a portion of the pooled resources. In such cases, each SL peripheral UE may refrain from using its own CR gap, because the CR gap has been pooled into the pooled resource and may be used when permitted by the SL hub UE via a CR-CMD. In some cases, the SL hub UE 404 may configure the SL peripheral UE 406a to receive and process the CR-CMD (e.g., over which channel to receive the CR-CMD and interpret/process the CR-CMD to determine its instructions). The CR-CMD to SL peripheral UE 460a, for example, may specify the number of sub-channels of the pooled resources of sub-channels that SL peripheral UE 406a can access for its communication needs. In some aspects, the CR-CMD allows SL peripheral UE 406a to access a portion of the pooled resources by adjusting the CR limit of SL peripheral UE 406a. For example, the SL hub UE 404 may configure the SL peripheral UE 406a such that an adjusted CR limit of the SL peripheral UE 406a allows the SL peripheral UE 406a to access the allowed portion of the pooled resources (e.g., to access additional sub-channels from the pooled resource). In some aspects, a CR-CMD may be transmitted to multiple SL peripheral UEs, i.e., the CR-CMD may be groupcasted to the multiple SL peripheral UEs to allow each SL peripheral UE access a portion of the resource pool.

In some aspects, as discussed above, the resource pool may be pooled from the CR gaps, if any, of each of the SL peripheral UEs of a star topology network of UEs. That is, in some aspects, the resource pool may be considered as a resource pool of CR gaps. In such cases, each SL peripheral UE may refrain from using the resource pool of CR gaps (e.g., which may include the CR gap contribution of that SL peripheral UE) until each receives a CR-CMD from the SL hub UE authorizing the use of at least a portion of the resource pool of CR gaps. In some aspects, the resource pool can be pooled from the CR limit of each of the SL peripheral UEs of a star topology network of UEs (i.e., each associating SL peripheral UE of the network of UEs). That is, the resource pool may be considered as a resource pool of CR limits. In such cases, the CR-CMD from the SL hub UE 404 to each SL peripheral UE of the star topology network of UEs may include a command or instruction informing that SL peripheral UE about the portion of the resource pool of CR limits that the SL peripheral UE can use. In other words, the CR-CMD may adjust the CR limit of each SL peripheral UE to allow the SL peripheral UE to access at most the portion of the resource pool of CR limits allowed by the CR-CMD for that SL peripheral UE.

In some aspects, the SL hub UE 404 may issue CR-CMD to some or all of the SL peripheral UEs of the star topology network of UEs to regulate the CR of the SL peripheral UEs. For example, as discussed above, the SL hub UE 404 may issue a CR-CMD to adjust (i.e., increase or decrease) the CR limit of SL peripheral UE 406a such that the SL peripheral UE 406a may occupy more or less sub-channels than allowed by its initial (i.e., unadjusted) CR limit. In some aspects, a CR-CMD issued to a SL peripheral UE may suppress data traffic from the SL peripheral UE. For example, a CR-CMD to SL peripheral UE 406a may adjust the CR limit of the SL peripheral UE 406a to a negative value, which the SL peripheral UE 406a may be configured to understand as an instruction to cease data traffic or transmission. In some cases, the SL hub UE 404 may issue CR-CMD with negative CR limit values to SL peripheral UEs when there may be a competition between forward link and reverse link transmissions, i.e., between data transmissions from and to the SL hub UE. For instance, the SL hub UE may issue a CR-CMD with negative value to some or all of SL peripheral UEs (e.g., UEs associating with the star topology network) to suppress data transmission from the SL peripheral UEs when there may be collision or conflict with forward link data transmission from the SL hub UE. For example, the SL hub UE may broadcast to the SL peripheral UEs of the star topology network a CR-CMD with negative value to suppress reverse link transmissions from the SL peripheral UEs, and the broadcast can be a sidelink control information (SCI) message including the negative value CR-CMD.

In some aspects, SL hub UE 404 may issue a CR-CMD with negative value to SL peripheral UE 406a in response to a cooperation request from other SL hub UEs requesting that the SL peripheral UE cease transmitting data for a specified period (e.g., to avoid congestion of the channel). For example, such a request may be received at a first SL hub UE from other SL hub UEs communicating with the first SL hub UE via over the air backhaul links (e.g., OTA X2). In some aspects, SL hub UE 404 may issue a CR-CMD with negative value to SL peripheral UE 406a in response to a radio resource management (RRM) command from gNB to which the SL hub UE is attached.

In some aspects, the CR-CMD issued by SL hub UE 404 to SL peripheral UE 406a may be valid only for a time period ("command window"). That is, the CR-CMD may be configured to adjust the CR limit of the SL peripheral UE 406a only during the command window. For example, a CR-CMD may allow SL peripheral UE 406a to access a portion of the resource pool, and the SL peripheral UE 406a may access the allowed portion during when the CR-CMD is valid, i.e., during the command window. In some aspects, the CR-CMD may have an associated time-stamp (e.g., carried explicitly by the payload of the CR-CMD and/or implicitly by the slot number of the radio resource used to send the CR-CMD), and the SL peripheral UE 406a that receives the CR-CMD may use this time stamp to determine whether the CR-CMD is valid. For example, if the time stamp is within the command window, then the SL peripheral UE 406a may determine that the CR-CMD is a valid command. In some cases, the time stamp may be outside of the command window, and the SL peripheral UE 406a may determine that the CR-CMD has expired (and as such, the CR limit may not be adjusted and the SL peripheral UE 406a may not be authorized to access a portion of the resource pool). In some aspects, the command window may have a pre-configured length or duration and may be a sliding window. In some cases, there may not be a CR-CMD with a time stamp within the command window, and in such cases, no SL peripheral UE may access any portion of the resource pool (e.g., no CR limit of a SL peripheral UE may be adjusted). In some aspects, allowing a CR-CMD to expire when the CR-CMD is not within a command window (e.g., as determined based on its time stamp) may reduce any signaling overhead, as the SL hub UE 404 may not have to issue another command to deactivate or cause the expiration of the CR-CMD. In other words, a CR-CMD with time stamp outside of the command window becomes invalid without further action from the SL hub UE that issued the CR-CMD. In some aspects, different types of CR-CMDs may be associated with different lengths of command windows, i.e., may have different validity period. For example, a CR-CMD with negative CR limit may have a different (e.g., longer or shorter) associated command window compared to CR-CMD with positive CR limit. That is, in some cases, CR-CMD with negative CR limits may be valid for longer or shorter period of time compared to CR-CMDs with positive CR limits.

In some aspects, there may be multiple valid CR-CMDs, i.e., there may be multiple CR-CMDs with time stamps located within the command window. In some cases, the newest or latest valid CR-CMD with a later time stamp may be configured to override an earlier valid CR-CMD with an older time stamp. For example, a SL peripheral UE that receives multiple valid CR-CMDs (i.e., CR-CMDs with time stamps within a command window) may check the time stamps of each CR-CMDs to identify the newest valid CR-CMD with the latest time stamp as the effective CR-CMD, i.e., the CR-CMD that may be configured to override the rest of the CR-CMDs. In some aspects, the multiple valid CR-CMDs may be combined to form an effective CR-CMR. For example, the effective CR-CMR may be a weighted sum of the multiple valid CR-CMDs. In some aspects, the weights for each of the multiple CR-CMDs may be determined based on the time stamp associated with each CR-CMD. For instance, a CR-CMD with an older time stamp may be assigned a larger weighting factor than a CR-CMD with a newer time stamp, and the effective CR-CMD may be calculated as a weighted sum of all the valid CR-CMDs.

In some aspects, upon receiving the CR-CMD at action 440 from the SL hub UE 404, the SL peripheral UE 406a may access a portion of the resource pool allowed by the CR-CMD for its communication purposes. For example, the CR-CMD may include a command or instruction adjusting the CR limit of the SL peripheral UE 406a such that the adjusted CR limit allows the SL peripheral UE to access the portion of the resource pool (e.g., sub-channels of SL channel). For instance, whether the resource pool is pooled from the CR gaps or CR limits of SL peripheral UEs of the star topology network of UEs (e.g., that includes SL peripheral UEs 406a and 406b), the CR-CMD may include a command to adjust a CR limit of SL peripheral UE 406a such that SL peripheral UE 406a can accesses the allowed portion of the resource pool. As an example illustration, the CR-CMD may specify the number of subchannels of a SL channel that the SL peripheral UE 406a may access. In some cases, the amount of the allowed portion of the resource pool may be different from the amount of resource that the SL peripheral UE 406a would have accessed prior to the adjustment of its CR limit by the CR-CMD. In other words, the amount of the allowed portion of the resource pool may be different from the amount of the resource that the SL peripheral UE could have accessed under the initial (i.e., unadjusted) CR limit. For instance, if the SL peripheral UE 406a contributes a first CR gap into the resource pool corresponding to a first number of subchannels, in some cases, the number of subchannels that a CR-CMD allows the SL peripheral UE 406a to access may be different from the first number of subchannels.

At action 460, in some aspects, the SL hub UE 404 may transmit a channel occupancy ratio-command (CR-CMD) to one or more SL peripheral UEs (e.g., SL peripheral UE 406b) providing the SL peripheral UE 406b with tokens that the SL peripheral UE 406b can use to access at least a portion of the resource pool. For example, a token may provide the SL peripheral UE 406b access to one unit of the resource pool (e.g., a sub-channel of a SL channel) and the CR-CMD transmitted to the SL peripheral UE 406b may provide the SL peripheral UE 406b one or more tokens to access a corresponding amount of the resource pool. In some aspects, the one or more tokens may be configured to allow the SL peripheral UE 406b to access more or less resources than the SL peripheral UE 406b would have accessed under its initial CR limit (e.g., the SL peripheral UE 406b may access more or less number of subchannels than allowed under its initial CR limit). In some aspects, the SL peripheral UE 406b may have an associated token bucket that is configured to receive the tokens from the SL hub UE 404 and indicate the amount of the resource pool (e.g., number of subchannels) that the SL peripheral UE 406b can access in accordance to the received tokens.

At action 470, in some aspects, the SL peripheral UE 406b may access or occupy some amount of the resource pool not exceeding the available number of tokens in the token bucket (i.e., not exceeding the amount of pooled resource that the CR-CMD allows the SL peripheral UE 406b to access). In such cases, tokens corresponding to the occupied or accessed amount of resource pool may be removed from the token bucket (e.g., to prevent the SL peripheral UE 406b from accessing more resources than allowed by the CR-CMD). In some aspects, the CR-CMD that provides one or more tokens to the SL peripheral UE 406b may not include a time stamp (for example, in contrast to the afore-mentioned CR-CMD that adjusts the CR limit of the SL peripheral UE 406a). In some aspects, a CR-CMD may be transmitted to multiple SL peripheral UEs, i.e., the CR-CMD may be groupcasted to the multiple SL peripheral UEs to allow each SL peripheral UE to access a portion of the resource pool.

In the discussion above with reference to FIG. 4, it is noted that the CR-CMD to SL peripheral UE 604a may include an adjustment to the CR limit of the SL peripheral UE 604a to allow the SL peripheral UE 604a access at least a portion of the pooled resource. It is also noted that the CR-CMD to SL peripheral UE 604b may include one or more tokens to allow the SL peripheral UE 604b access at least a portion of the pooled resource. In some aspects, a SL peripheral UE (e.g., such as 604a or 604b) may be configured to support or recognize either one of these two types of commands, but not both. That is, a SL peripheral UE may be configured to support or recognize a CR-CMD that either adjusts its CR limit or provides the SL peripheral UE with tokens, but not both. In some aspects, SL peripheral UEs may be configured to support or recognize both of these types of commands. In such aspects, the SL hub UE may transmit both types of commands to a SL peripheral UE and request that the SL peripheral UE respect or accept both commands. For example, a SL hub UE may transmit a first CR-CMD adjusting the CR limit of a SL peripheral UE and a second CR-CMD providing the SL peripheral UE with tokens, and request that the SL peripheral UE respect both commands. In some cases, the SL hub UE may transmit commands of both types and request that a SL peripheral UE respect or accept one type of command. For example, a SL hub UE may broadcast a first CR-CMD to some or all of the SL peripheral UEs of a star topology network of UEs and may transmit a second CR-CMD of a different type to a particular SL peripheral UE, with an instruction that the SL peripheral UE accept or respect either the first or second CR-CMD over the other CR-CMD.

In some aspects, the SL hub UE of a star topology network of UEs may use the pooled resource to communicate with the SL peripheral UEs of the network. For example, the SL hub UE can use the resource pool (e.g., of subchannels of SL channel) for forward link direction for transmissions to the SL peripheral UEs associated with the star topology network. In some aspects, allowing the SL hub UE to use the resource pool may allow for establishment of a star topology network without specifying beforehand which SL UE may become a SL hub UE of the star topology network. In some aspects, as discussed above, the SL hub UE may transmit CR-CMs with negative CR limit values to suppress transmissions in the reverse link direction (e.g., transmissions from the SL peripheral UE to the SL hub UE) if there may be conflict with transmissions in the forward link direction.

In some aspects, an SL hub UE of a star topology network of UEs can use the resource pool for triggered reverse link direction transmissions from the SL peripheral UEs of the star topology. For example, in some respects, the SL hub UE may trigger a SL peripheral UE to commence transmission to the SL hub UE and allow the SL peripheral UE to use the resource pool for the transmission. In such cases of triggered reverse link transmissions, the SL peripheral UE may not count the amount of resource pool used for the triggered transmission against a portion of the resource pool assigned for use by the SL hub UE to the SL peripheral UE. As an example illustration, a SL hub UE may transmit a CR-CMD allowing a SL peripheral UE to access a portion of pooled subchannels (e.g., by adjusting the CR limit of the SL peripheral UE or providing the SL peripheral UE tokens to access the portion). In some cases, the SL hub UE may trigger a reverse link transmission from the SL peripheral UE, and the number of subchannels used by the SL peripheral UE may not be counted against or subtracted from the allowed portion of the pooled subchannels.

Figure 5:
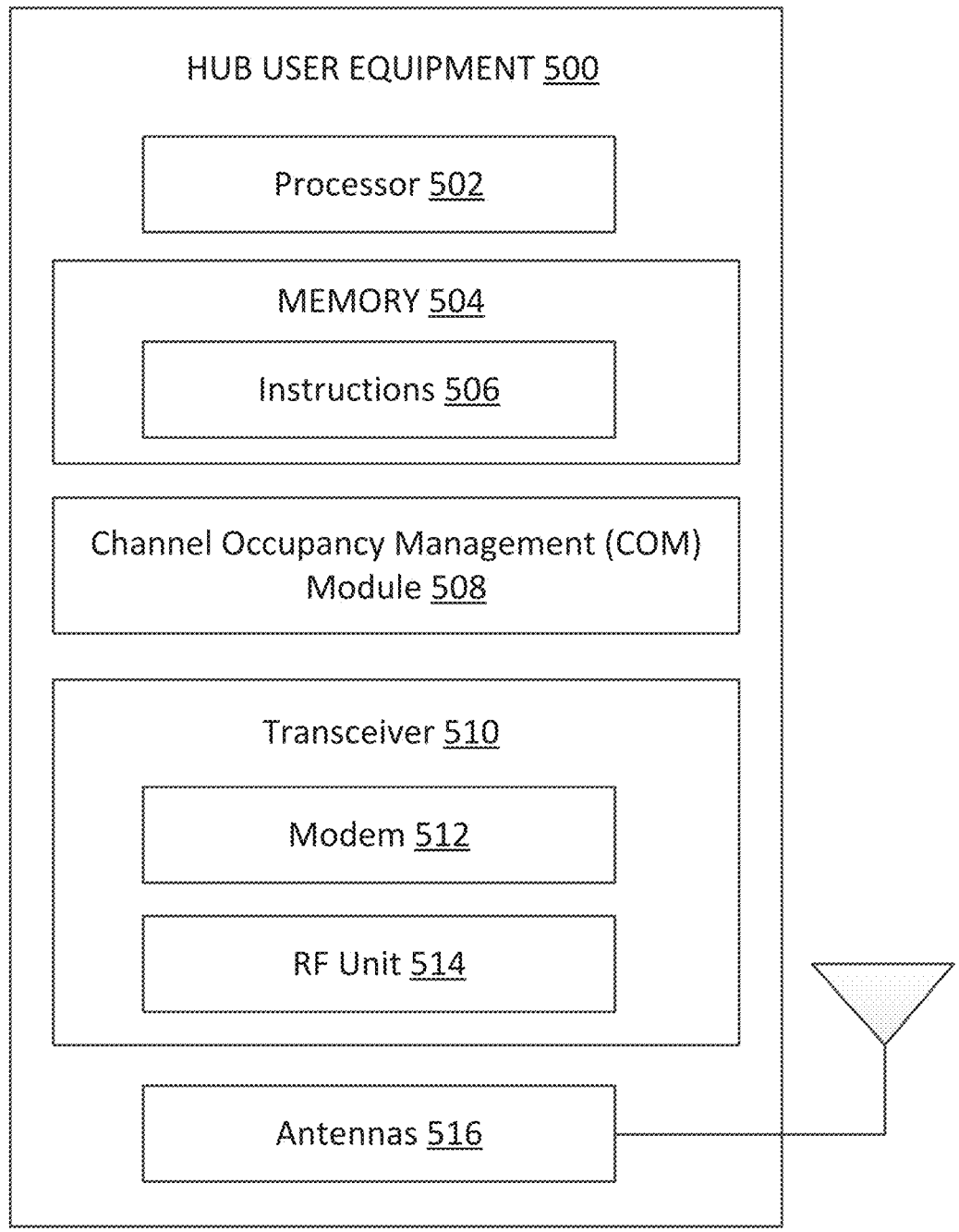
FIG. 5 is a block diagram of an exemplary hub UE, according to some aspects of the present disclosure.

FIG. 5 is a block diagram of an exemplary SL hub UE 500 according to some aspects of the present disclosure. The SL hub UE 500 may be a UE 115 in the network 100 as discussed above in FIG. 1, a SL hub UE 204 as discussed above in FIG. 2, or a SL hub UE 404 as discussed above in FIG. 4. As shown, the SL hub UE 500 may include a processor 502, a memory 504, a channel occupancy management (COM) module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-4. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The COM module 508 may be implemented via hardware, software, or combinations thereof. For example, the COM module 508 may be implemented as a processor, circuit, and/or instructions 506 stored in the memory 504 and executed by the processor 502. In some examples, the COM module 508 can be integrated within the modem subsystem 512. For example, the COM module 508 can be implemented by a combination of software components (e.g., executed by a DSP or a general processor) and hardware components (e.g., logic gates and circuitry) within the modem subsystem 512.

The COM module 508 may be used for various aspects of the present disclosure, for example, aspects of FIGS. 1-4. The COM module 508 can be configured to determine a communication resources pool including a channel occupancy ratio (CR) gap of each UE of a plurality of UEs (e.g., SL peripheral UE 206a, 206b, 206c, 406a, 406b) in communication with a first UE (e.g., SL hub UE 204a, 204b, 404). In some aspects, a CR gap of each UE can represent a difference between a CR limit of that UE and a CR of that UE. The COM module 508 may also be configured to communicate, to a second UE of the plurality of UEs, a first CR command configured to allow the second UE to access a first portion of the communication resources pool. In some aspects, an amount of the first portion can be different from an amount of the CR gap of the second UE in the communication resources pool.

As shown, the transceiver 510 may include the modem subsystem 512 and the RF unit 514. The transceiver 510 can be configured to communicate bi-directionally with other devices, such as the UEs 115, and/or the UEs 115, 204, 206, 404, and/or 406, and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PSBCH, sidelink RMSI, PSSCH, PSCCH, PSFCH, PC5-RRC configuration, control commands) from the modem subsystem 512 (on outbound transmissions) or of transmissions originating from another source such as a UE 115. The RF unit 514 may be further configured to perform analog beamforming in conjunction with the digital beamforming. Although shown as integrated together in transceiver 510, the modem subsystem 512 and/or the RF unit 514 may be separate devices that are coupled together at a UE 115, 204, or 404 to enable the UE 115, 204, or 404 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PSCCH, PSSCH, PSFCH, measurement data, and/or sensor data records) to the COM module 508 for processing. The antennas 516 may include multiple antennas of similar or different designs in order to sustain multiple transmission links.

In some aspects, the transceiver 510 is configured to communicate with components of the SL hub UE 500 to communicate, to a UE of a plurality of UEs, a first CR command configured to allow the UE to access a first portion of the communication resources pool. In such aspects, the amount of the first portion can be different from the amount of the CR gap of the UE in the communication resources pool.

In an aspect, the SL hub UE 500 can include multiple transceivers 510 implementing different RATs (e.g., NR and LTE). In an aspect, the SL hub UE 500 can include a single transceiver 510 implementing multiple RATs (e.g., NR and LTE). In an aspect, the transceiver 510 can include various components, where different combinations of components can implement different RATs.

Figure 6:
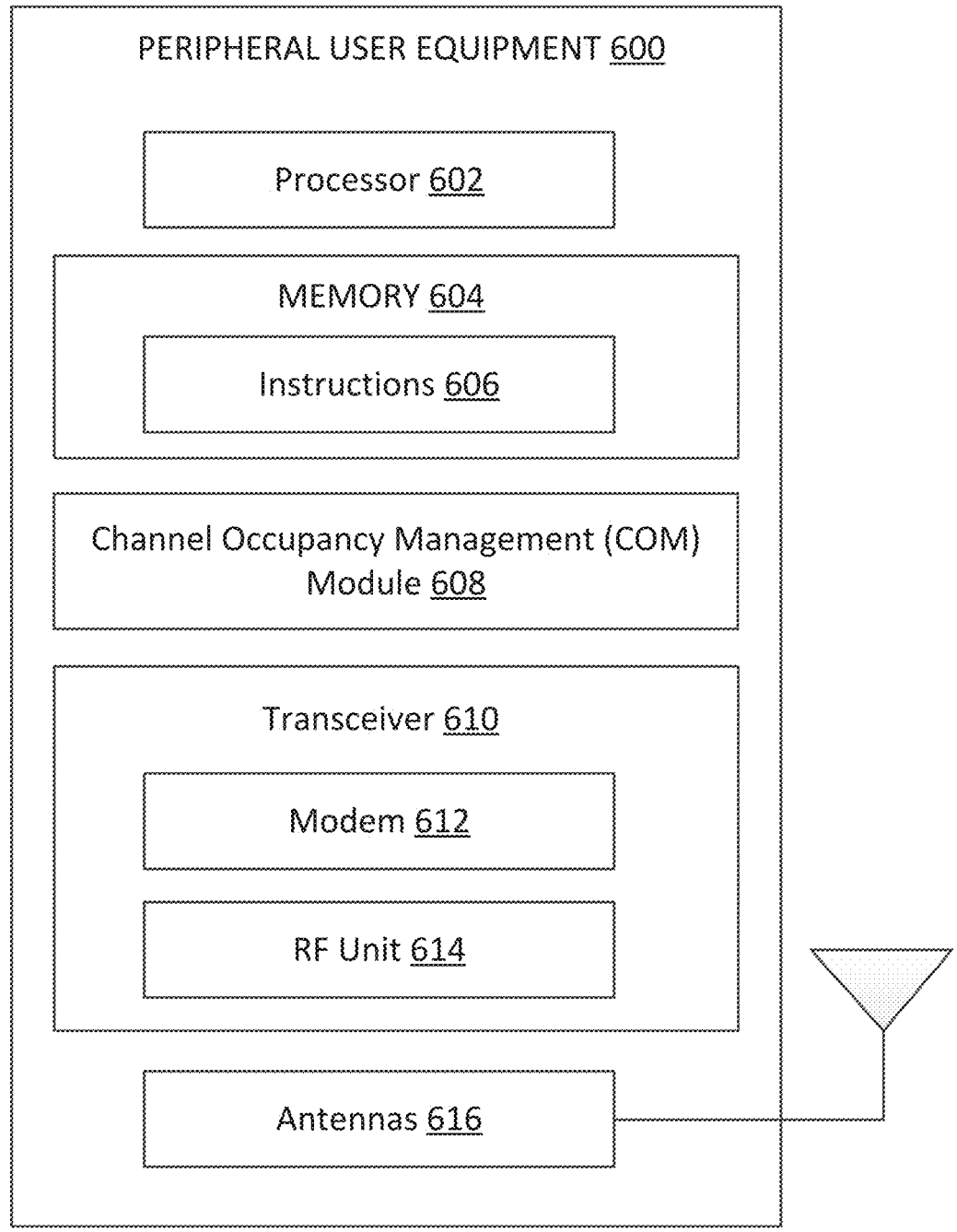
FIG. 6 is a block diagram of an exemplary peripheral UE, according to some aspects of the present disclosure.

FIG. 6 is a block diagram of an exemplary SL peripheral UE 600 according to some aspects of the present disclosure. The SL peripheral UE 600 may be a UE 115 as discussed above with respect to FIG. 1, a SL peripheral UE 206 as discussed above in FIG. 2, or a SL peripheral 406 as discussed above in FIG. 4. As shown, the SL peripheral UE 600 may include a processor 602, a memory 604, a COM module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 1-4. Instructions 606 may also be referred to as program code, which may be interpreted broadly to include any type of computer-readable statement(s) as discussed above with respect to FIG. 5.

The COM module 608 may be implemented via hardware, software, or combinations thereof. For example, the COM module 608 may be implemented as a processor, circuit, and/or instructions 606 stored in the memory 604 and executed by the processor 602. In some examples, the COM module 608 can be integrated within the modem subsystem 612. For example, the COM module 608 can be implemented by a combination of software components (e.g., executed by a DSP or a general processor) and hardware components (e.g., logic gates and circuitry) within the modem subsystem 612.

The COM module 608 may be used for various aspects of the present disclosure, for example, aspects of FIGS. 1-4. The COM module 608 is configured to communicate, to a second UE (e.g., SL hub UEs 204, 404) that is in communication with the plurality of UEs (e.g., SL peripheral UEs 206, 406), a UE report including a CR gap of a first UE (e.g., SL peripheral UEs 206, 406) representing a difference between a CR limit of the first UE and a CR of the first UE. The COM module 608 may also be configured to receive, from the second UE, a first CR command configured to allow the first UE to access a first portion of a communication resources pool including the CR gap of the first UE. In some aspects, an amount of the first portion can be different from an amount of the CR gap of the first UE in the communication resources pool.

As shown, the transceiver 610 may include the modem subsystem 612 and the RF unit 614. The transceiver 610 can be configured to communicate bi-directionally with other devices, such as the BSs 105 and/or the UEs 115, 204, 206, 404, and/or 406. The modem subsystem 612 may be configured to modulate and/or encode the data from the memory 604 and/or the COM module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PSCCH, PSSCH, PSFCH, measurement data, and/or sensor data records) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may include one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., PSBCH, sidelink RMSI, PSSCH, PSCCH, PSFCH, PC5-RRC configuration, control commands) to the COM module 608 for processing. The antennas 616 may include multiple antennas of similar or different designs in order to sustain multiple transmission links. The RF unit 614 may configure the antennas 616.

In some aspects, the transceiver 610 is configured to communicate with components of the SL peripheral UE 600 to receive, from the second UE, a first CR command configured to allow the first UE to access a first portion of a communication resources pool including the CR gap of the first UE. In some aspects, the amount of the first portion can be different from an amount of the CR gap of the first UE in the communication resources pool.

In an aspect, the SL peripheral UE 600 can include multiple transceivers 610 implementing different RATs (e.g., NR and LTE). In an aspect, the SL peripheral UE 600 can include a single transceiver 610 implementing multiple RATs (e.g., NR and LTE). In an aspect, the transceiver 610 can include various components, where different combinations of components can implement different RATs.

Figure 7:
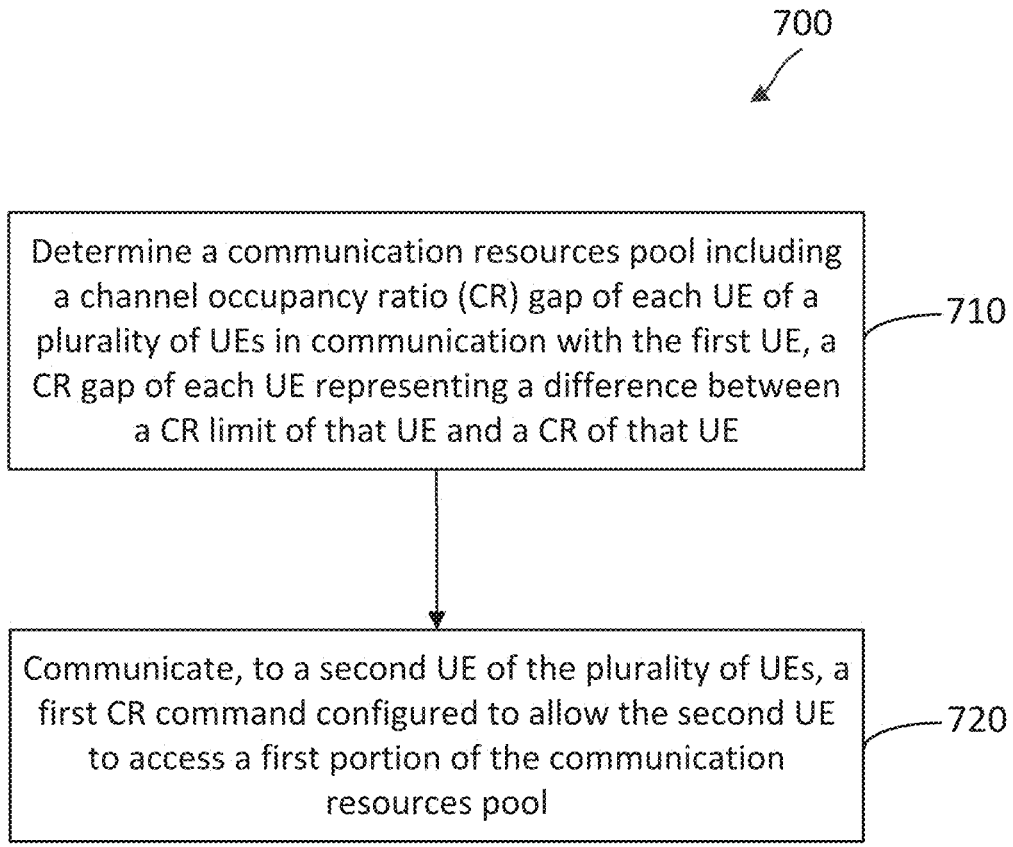
FIG. 7 is a flow diagram illustrating channel occupancy management method for new radio star topology network of UEs, according to some aspects of the present disclosure.

FIG. 7 is a flow diagram illustrating channel occupancy management method 700 for new radio star topology network of UEs, according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as a UE 115, a SL hub UE 204, a SL hub UE 404, or a SL hub UE 500, may utilize one or more components, such as the processor 502, the memory 504, the COM module 508, the transceiver 510, the modem 512, and/or the one or more antennas 516, to execute the steps of method 700. The method 700 may employ similar mechanisms as described above in FIGS. 1-4. As illustrated, the method 700 includes a number of enumerated steps, but aspects of the method 700 may include additional steps before, after, and in between the enumerated steps. In some aspects, one or more of the enumerated steps may be omitted or performed in a different order.

At block 710, a first sidelink UE determines a communication resources pool including a channel occupancy ratio (CR) gap of each UE of a plurality of UEs in communication with the first UE. In some aspects, the CR gap of each UE may represent a difference between a CR limit of that UE and a CR of that UE. In some aspects, the first sidelink UE may correspond to a UE 115, a SL hub UE 204, a SL hub UE 404, or a SL hub UE 500. In some aspects, the plurality of UEs may correspond to UE 115, a SL peripheral UE 206, a SL peripheral UE 406, or a SL peripheral UE 600. In some instances, the first sidelink UE may utilize one or more components, such as the processor 502, the memory 504, the COM module 508, the transceiver 510, the modem 512, and/or the one or more antennas 516, to determine a communication resources pool including a channel occupancy ratio (CR) gap of each UE of a plurality of UEs in communication with the first UE.

At block 720, the first sidelink UE communicates, to a second UE of the plurality of UEs, a first CR command configured to allow the second sidelink UE to access a first portion of the communication resources pool. In some aspects, an amount of the first portion can be different from an amount of the CR gap of the second UE in the communication resources pool. In some instances, the first sidelink UE may utilize one or more components, such as the processor 502, the memory 504, the COM module 508, the transceiver 510, the modem 512, and/or the one or more antennas 516, to communicate, to a second UE of the plurality of UEs, the first CR command configured to allow the second sidelink UE to access the first portion of the communication resources pool.

In some respects, the first CR command may include a time stamp identifying a command time window outside of which the first CR command is invalid. In some respects, the first CR command can include a first time stamp indicating a first moment in time, and the first sidelink UE may communicate, to the second UE, a second CR command including a second time stamp indicating a later moment in time than the first moment. In some cases, the second CR command can be configured to override the first CR command.

In some aspects, the first sidelink UE may be configured to communicate, to the second UE, a second CR command to allow the second UE to access a second portion of the communication resources pool. In some aspects, the second CR command may be configured to allow the second UE to access a third portion of the communication resources pool. Further, in some aspects, the second portion of the communication resources pool can be a weighted average of the first portion of the communication resources pool and the third portion of the communication resources pool. In some aspects, the first CR command can include a first time stamp indicating a first moment in time and the second CR command can include a second time stamp indicating a later moment in time than the first moment. Further, in some aspects, the weighted average can be calculated using a weighting factor for the first portion of the communication resources pool that is greater than a weighting factor for the third portion of the communication resources pool.

In some aspects, the first sidelink UE can be communicating, to the second UE, a second CR command including a negative CR limit for the second UE configured to prevent the second UE from accessing a CR of the second UE. In some aspects, the first CR command may be configured to allow the second UE to access the first portion of the communication resources pool by adjusting a CR limit of the second UE. In some aspects, the first CR command may be configured to allow the second UE to access the first portion by providing the second UE one or more tokens, a token of the one or more tokens configured to be used by the second UE to access a unit communication resource of the first portion of the communication resources pool. In some aspects, the first sidelink UE may receive, from each UE of the plurality of UEs, a UE report including the CR gap of that UE. In some aspects, the communication resources pool may be determined by pooling the CR gap of each UE of the plurality of UEs. In some aspects, the first sidelink UE may also be configured to receive, from the second UE, a UE report including a channel busy ratio (CBR) measurement performed by the second UE. In some aspects, the first sidelink UE may further be configured to determine a CR limit of the second UE based on the CBR measurement. In some aspects, the first sidelink UE may be configured to monitor a communication from the second UE to the first UE to determine a CR of the second UE; and determine a CR gap of the second UE based on the CBR measurement and the determined CR of the second UE. In some aspects, the first sidelink UE may be configured to determine the CR gap occurs when the measured CR of the second UE exceeds a threshold CR.

In some aspects, the first sidelink UE may be configured to broadcast, to the plurality of UEs, a baseline channel busy ratio (CBR); and receive, from each UE of the plurality of UEs, a UE report including a difference between a channel busy ratio (CBR) measurement performed by that UE and the baseline CBR. In some aspects, the UE report may be received when the difference is a positive difference. In some aspects, the first sidelink UE may be configured to communicate, with a third UE of the plurality of UEs, using a second portion of the communication resources pool.

Figure 8:
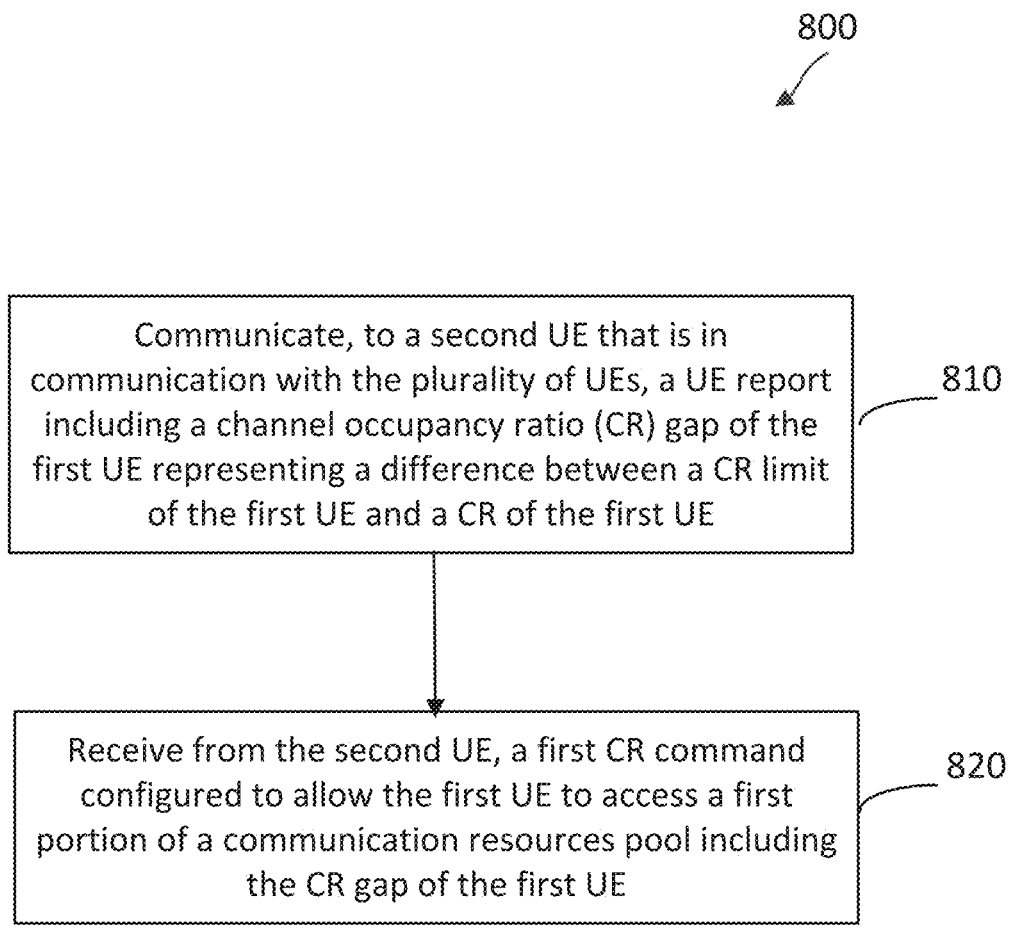
FIG. 8 is a flow diagram illustrating channel occupancy management method for new radio star topology network of UEs, according to some aspects of the present disclosure.

FIG. 8 is a flow diagram illustrating channel occupancy management method 800 for new radio star topology network of UEs, according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as a UE 115, a SL peripheral UE 206, a SL peripheral UE 406, or a SL peripheral UE 600, may utilize one or more components, such as the processor 602, the memory 604, the COM module 608, the transceiver 610, the modem 612, and/or the one or more antennas 616, to execute the steps of method 800. The method 800 may employ similar mechanisms as described above in FIGS. 1-4. As illustrated, the method 800 includes a number of enumerated steps, but aspects of the method 800 may include additional steps before, after, and in between the enumerated steps. In some aspects, one or more of the enumerated steps may be omitted or performed in a different order.

At block 810, a first sidelink UE communicates, to a second UE that is in communication with the plurality of UEs, a UE report including a CR gap of the first UE representing a difference between a CR limit of the first UE and a CR of the first UE. The first sidelink UE may correspond to a UE 115, a SL peripheral UE 206, a SL peripheral UE 604, or a SL peripheral UE 600. In some instances, the first sidelink UE may utilize one or more components, such as the processor 602, the memory 604, the COM module 608, the transceiver 610, the modem 612, and/or the one or more antennas 616, to communicate, to a second UE that is in communication with the plurality of UEs, a UE report including a CR gap of the first UE representing a difference between a CR limit of the first UE and a CR of the first UE. In some aspects, the first sidelink UE may be configured to receive, from the second UE, a first CR command configured to allow the first UE to access a first portion of a communication resources pool including the CR gap of the first UE. In some aspects, an amount of the first portion can be different from an amount of the CR gap of the first UE in the communication resources pool.

In some aspects, the first CR command can include a time stamp identifying a command time window outside of which the first CR command is invalid. In some aspects, the first CR command includes a first time stamp indicating a first moment in time, and the first sidelink UE may be configured to receive, from the second UE, a second CR command including a second time stamp indicating a later moment in time than the first moment. In some aspects, the second CR command may be configured to override the first CR command.

In some aspects, the first sidelink UE may be configured to receive, from the second UE, a second CR command to allow the first UE to access a second portion of the communication resources pool. In some aspects, the second CR command may be configured to allow the first UE to access a third portion of the communication resources pool; and the second portion of the communication resources pool can be a weighted average of the first portion of the communication resources pool and the third portion of the communication resources pool. In some aspects, the first CR command may include a first time stamp indicating a first moment in time and the second CR command may include a second time stamp indicating a later moment in time than the first moment. Further, in some aspects, the weighted average may be calculated using a weighting factor for the first portion of the communication resources pool that is greater than a weighting factor for the third portion of the communication resources pool.

In some aspects, the first sidelink UE may be further configured to receive, from the second UE, a second CR command including a negative CR limit for the first UE configured to prevent the first UE from accessing a CR of the first UE. In some aspects, the first CR command can be configured to allow the first UE to access the first portion of the communication resources pool by adjusting a CR limit of the first UE. In some aspects, the first CR command can be configured to allow the first UE to access the first portion of the communication resources pool by providing the first UE one or more tokens, a token of the one or more tokens configured to be used by the first UE to access a unit communication resource of the first portion of the communication resources pool. In some aspects, the communication resources pool may be determined by pooling a CR gap of each UE of the plurality of UEs.

In some aspects, the first sidelink UE may be configured to transmit, to the second UE, a UE report including a channel busy ratio (CBR) measurement performed by the first UE. In some aspects, the second UE may determine a CR limit of the first UE based on the CBR measurement. In some aspects, the second UE (i) may determine a CR of the first UE by monitoring a communication of the first UE to the second UE; and (ii) may determine a CR gap of the first UE based on the CBR measurement and the determined CR of the first UE. In some aspects, the second UE can determine the CR gap when the measured CR of the first UE exceeds a threshold CR.

In some aspects, the first sidelink UE may be configured to receive, from the second UE, a baseline channel busy ratio (CBR) broadcast to the plurality of UEs; and communicate, to the second UE, a UE report including a difference between a channel busy ratio (CBR) measurement performed by the first UE and the baseline CBR. In some aspects, the communicating the UE report may occur when the difference is a positive difference. In some aspects, the second UE may communicate with a third UE of the plurality of UEs, using a second portion of the communication resources pool.

Recitations of Some Aspects of the Disclosure

Aspect 1: A method of wireless communication performed by a first user equipment (UE), the method comprising: determining a communication resources pool including a channel occupancy ratio (CR) gap of each UE of a plurality of UEs in communication with the first UE, a CR gap of each UE representing a difference between a CR limit of that UE and a CR of that UE; and communicating, to a second UE of the plurality of UEs, a first CR command configured to allow the second UE to access a first portion of the communication resources pool, an amount of the first portion being different from an amount of the CR gap of the second UE in the communication resources pool.

Aspect 2: The method of aspect 1, wherein the first CR command includes a time stamp identifying a command time window outside of which the first CR command is invalid.

Aspect 3: The method of aspect 1 or 2, wherein the first CR command includes a first time stamp indicating a first moment in time, the method further comprising: communicating, to the second UE, a second CR command including a second time stamp indicating a later moment in time than the first moment, the second CR command configured to override the first CR command.

Aspect 4: The method of any of aspects 1-3, further comprising: communicating, to the second UE, a second CR command to allow the second UE to access a second portion of the communication resources pool, the second CR command configured to allow the second UE to access a third portion of the communication resources pool; and the second portion of the communication resources pool being a weighted average of the first portion of the communication resources pool and the third portion of the communication resources pool.

Aspect 5: The method of aspect 4, wherein: the first CR command includes a first time stamp indicating a first moment in time and the second CR command includes a second time stamp indicating a later moment in time than the first moment; and the weighted average is calculated using a weighting factor for the first portion of the communication resources pool that is greater than a weighting factor for the third portion of the communication resources pool.

Aspect 6: The method of any of aspects 1-5, further comprising communicating, to the second UE, a second CR command including a negative CR limit for the second UE configured to prevent the second UE from accessing a CR of the second UE.

Aspect 7: The method of any of aspects 1-6, wherein the first CR command is configured to allow the second UE to access the first portion of the communication resources pool by adjusting a CR limit of the second UE.

Aspect 8: The method of any of aspects 1-7, wherein the first CR command is configured to allow the second UE to access the first portion by providing the second UE one or more tokens, a token of the one or more tokens configured to be used by the second UE to access a unit communication resource of the first portion of the communication resources pool.

Aspect 9: The method of any of aspects 1-8, further comprising receiving, from each UE of the plurality of UEs, a UE report including the CR gap of that UE, wherein: the communication resources pool is determined by pooling the CR gap of each UE of the plurality of UEs.

Aspect 10: The method of any of aspects 1-9, further comprising: receiving, from the second UE, a UE report including a channel busy ratio (CBR) measurement performed by the second UE; and determining a CR limit of the second UE based on the CBR measurement.

Aspect 11: The method of aspect 10, further comprising: monitoring a communication from the second UE to the first UE to determine a CR of the second UE; and determining a CR gap of the second UE based on the CBR measurement and the determined CR of the second UE.

Aspect 12: The method of aspect 11, wherein the determining the CR gap occurs when the measured CR of the second UE exceeds a threshold CR.

Aspect 13: The method of any of aspects 1-12, further comprising: broadcasting, to the plurality of UEs, a baseline channel busy ratio (CBR); and receiving, from each UE of the plurality of UEs, a UE report including a difference between a channel busy ratio (CBR) measurement performed by that UE and the baseline CBR.

Aspect 14: The method of aspect 13, wherein the UE report is received when the difference is a positive difference.

Aspect 15: The method of any of aspects 1-14, further comprising: communicating, with a third UE of the plurality of UEs, using a second portion of the communication resources pool.

Aspect 16: A method of wireless communication performed by a first user equipment (UE) of a plurality of UEs, the method comprising: communicating, to a second UE that is in communication with the plurality of UEs, a UE report including a CR gap of the first UE representing a difference between a CR limit of the first UE and a CR of the first UE; and receiving, from the second UE, a first CR command configured to allow the first UE to access a first portion of a communication resources pool including the CR gap of the first UE, an amount of the first portion being different from an amount of the CR gap of the first UE in the communication resources pool.

Aspect 17: The method of aspect 16, wherein the first CR command includes a time stamp identifying a command time window outside of which the first CR command is invalid.

Aspect 18: The method of aspect 16 or 17, wherein the first CR command includes a first time stamp indicating a first moment in time, the method further comprising: receiving, from the second UE, a second CR command including a second time stamp indicating a later moment in time than the first moment, the second CR command configured to override the first CR command.

Aspect 19: The method of any of aspects 16-18, further comprising: receiving, from the second UE, a second CR command to allow the first UE to access a second portion of the communication resources pool, the second CR command configured to allow the first UE to access a third portion of the communication resources pool, and the second portion of the communication resources pool being a weighted average of the first portion of the communication resources pool and the third portion of the communication resources pool.

Aspect 20: The method of aspect 19, wherein: the first CR command includes a first time stamp indicating a first moment in time and the second CR command includes a second time stamp indicating a later moment in time than the first moment; and the weighted average is calculated using a weighting factor for the first portion of the communication resources pool that is greater than a weighting factor for the third portion of the communication resources pool.

Aspect 21: The method of any of aspects 16-20, further comprising receiving, from the second UE, a second CR command including a negative CR limit for the first UE configured to prevent the first UE from accessing a CR of the first UE.

Aspect 22: The method of any of aspects 16-21, wherein the first CR command is configured to allow the first UE to access the first portion of the communication resources pool by adjusting a CR limit of the first UE.

Aspect 23: The method of any of aspects 16-22, wherein the first CR command is configured to allow the first UE to access the first portion of the communication resources pool by providing the first UE one or more tokens, a token of the one or more tokens configured to be used by the first UE to access a unit communication resource of the first portion of the communication resources pool.

Aspect 24: The method of any of aspects 16-23, wherein the communication resources pool is determined by pooling a CR gap of each UE of the plurality of UEs.

Aspect 25: The method of any of aspects 16-24, further comprising: transmitting, to the second UE, a UE report including a channel busy ratio (CBR) measurement performed by the first UE, the second UE determining a CR limit of the first UE based on the CBR measurement.

Aspect 26: The method of aspect 25, wherein the second UE (i) determines a CR of the first UE by monitoring a communication of the first UE to the second UE; and (ii) determines a CR gap of the first UE based on the CBR measurement and the determined CR of the first UE.

Aspect 27: The method of aspect 26, wherein the second UE determines the CR gap when the measured CR of the first UE exceeds a threshold CR.

Aspect 28: The method of any of aspects 16-27, further comprising: receiving, from the second UE, a baseline channel busy ratio (CBR) broadcast to the plurality of UEs; and communicating, to the second UE, a UE report including a difference between a channel busy ratio (CBR) measurement performed by the first UE and the baseline CBR.

Aspect 29: The method of aspect 28, wherein the communicating the UE report occurs when the difference is a positive difference.

Aspect 30: The method of any of aspects 16-29, wherein the second UE communicates with a third UE of the plurality of UEs, using a second portion of the communication resources pool.

Aspect 31: A user equipment (UE), comprising: a memory; a processor coupled to the memory; and a transceiver coupled to the processor, and configured to perform the methods of aspects 1-15.

Aspect 32: A user equipment (UE), comprising: a memory; a processor coupled to the memory; and a transceiver coupled to the processor, and configured to perform the methods of aspects 16-30.

Aspect 33: A user equipment (UE) comprising means for performing the methods of aspects 1-15.

Aspect 34: A user equipment (UE) comprising means for performing the methods of aspects 16-30.

Aspect 35: A non-transitory computer-readable medium (CRM) having program code recorded thereon, the program code comprises code for causing a user equipment (UE) to perform the methods of aspects 1-15.

Aspect 36: A non-transitory computer-readable medium (CRM) having program code recorded thereon, the program code comprises code for causing a user equipment (UE) to perform the methods of aspects 16-30.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
   determining a communication resources pool including a channel occupancy ratio (CR) gap of each UE of a plurality of UEs in communication with the first UE, a CR gap of each UE representing a difference between a CR limit of that UE and a CR of that UE; and
   communicating, to a second UE of the plurality of UEs, a first CR command configured to allow the second UE to access a first portion of the communication resources pool,
      an amount of the first portion being different from an amount of the CR gap of the second UE in the communication resources pool.

2. The method of claim 1, wherein the first CR command includes a time stamp identifying a command time window outside of which the first CR command is invalid.

3. The method of claim 1, wherein the first CR command includes a first time stamp indicating a first moment in time, the method further comprising:
   communicating, to the second UE, a second CR command including a second time stamp indicating a later moment in time than the first moment, the second CR command configured to override the first CR command.

4. The method of claim 1, further comprising:
   communicating, to the second UE, a second CR command to allow the second UE to access a second portion of the communication resources pool,
      the second CR command configured to allow the second UE to access a third portion of the communication resources pool; and
      the second portion of the communication resources pool being a weighted average of the first portion of the communication resources pool and the third portion of the communication resources pool.

5. The method of claim 4, wherein:
the first CR command includes a first time stamp indicating a first moment in time and the second CR command includes a second time stamp indicating a later moment in time than the first moment; and
the weighted average is calculated using a weighting factor for the first portion of the communication resources pool that is greater than a weighting factor for the third portion of the communication resources pool.

6. The method of claim 1, further comprising communicating, to the second UE, a second CR command including a negative CR limit for the second UE configured to prevent the second UE from accessing a CR of the second UE.

7. The method of claim 1, wherein the first CR command is configured to allow the second UE to access the first portion of the communication resources pool by adjusting a CR limit of the second UE.

8. A method of wireless communication performed by a first user equipment (UE) of a plurality of UEs, the method comprising:
communicating, to a second UE that is in communication with the plurality of UEs, a UE report including a CR gap of the first UE representing a difference between a CR limit of the first UE and a CR of the first UE; and
receiving, from the second UE, a first CR command configured to allow the first UE to access a first portion of a communication resources pool including the CR gap of the first UE,
an amount of the first portion being different from an amount of the CR gap of the first UE in the communication resources pool.

9. The method of claim 8, wherein the first CR command is configured to allow the first UE to access the first portion of the communication resources pool by providing the first UE one or more tokens, a token of the one or more tokens configured to be used by the first UE to access a unit communication resource of the first portion of the communication resources pool.

10. The method of claim 8, wherein the communication resources pool is determined by pooling a CR gap of each UE of the plurality of UEs.

11. The method of claim 8, further comprising:
transmitting, to the second UE, a UE report including a channel busy ratio (CBR) measurement performed by the first UE,
the second UE determining a CR limit of the first UE based on the CBR measurement.

12. The method of claim 11, wherein the second UE (i) determines a CR of the first UE by monitoring a communication of the first UE to the second UE; and (ii) determines a CR gap of the first UE based on the CBR measurement and the determined CR of the first UE.

13. The method of claim 12, wherein the second UE determines the CR gap when the measured CR of the first UE exceeds a threshold CR.

14. The method of claim 8, further comprising:
receiving, from the second UE, a baseline channel busy ratio (CBR) broadcast to the plurality of UEs; and
communicating, to the second UE, a UE report including a difference between a channel busy ratio (CBR) measurement performed by the first UE and the baseline CBR, the communicating the UE report occurring when the difference is a positive difference.

15. The method of claim 8, wherein the second UE communicates with a third UE of the plurality of UEs, using a second portion of the communication resources pool.

16. A first user equipment (UE) comprising:
a processor configured to:
determine a communication resources pool including a channel occupancy ratio (CR) gap of each UE of a plurality of UEs in communication with the first UE, a CR gap of each UE representing a difference between a CR limit of that UE and a CR of that UE; and
a transceiver configured to:
communicate, to a second UE of the plurality of UEs, a first CR command configured to allow the second UE to access a first portion of the communication resources pool,
an amount of the first portion being different from an amount of the CR gap of the second UE in the communication resources pool.

17. The first UE of claim 16, wherein the first CR command is configured to allow the second UE to access the first portion by providing the second UE one or more tokens, a token of the one or more tokens configured to be used by the second UE to access a unit communication resource of the first portion of the communication resources pool.

18. The first UE of claim 16, wherein:
the transceiver is further configured to receive, from each UE of the plurality of UEs, a UE report including the CR gap of that UE; and
the communication resources pool is determined by pooling the CR gap of each UE of the plurality of UEs.

19. The first UE of claim 16, wherein:
the transceiver is further configured to receive, from the second UE, a UE report including a channel busy ratio (CBR) measurement performed by the second UE; and
the transceiver is further configured to determine a CR limit of the second UE based on the CBR measurement.

20. The first UE of claim 19, wherein the processor is further configured to:
monitor a communication from the second UE to the first UE to determine a CR of the second UE;
determine a CR gap of the second UE based on the CBR measurement and the measured CR of the second UE; and
determine the CR gap when the measured CR of the second UE exceeds a threshold CR.

21. The first UE of claim 16, wherein the transceiver is further configured to:
broadcast, to the plurality of UEs, a baseline channel busy ratio (CBR); and
receive, from each UE of the plurality of UEs, a UE report including a difference between a channel busy ratio (CBR) measurement performed by that UE and the baseline CBR.

22. The first UE of claim 21, wherein the UE report is received when the difference is a positive difference.

23. The first UE of claim 16, wherein the transceiver is further configured to communicate, with a third UE of the plurality of UEs, using a second portion of the of the communication resources pool.

24. A first user equipment (UE) comprising:
a processor configured to:
communicate, to a second UE that is in communication with the plurality of UEs, a UE report including a CR gap of the first UE representing a difference between a CR limit of the first UE and a CR of the first UE; and
a transceiver configured to:
receive, from the second UE, a first CR command configured to allow the first UE to access a first portion of a communication resources pool including the CR gap of the first UE,
an amount of the first portion being different from an amount of the CR gap of the first UE in the communication resources pool.

25. The first UE of claim 24, wherein the first CR command includes a time stamp identifying a command time window outside of which the first CR command is invalid.

26. The first UE of claim 24, wherein the first CR command includes a first time stamp indicating a first moment in time, the transceiver further configured to:
receive, from the second UE, a second CR command including a second time stamp indicating a later moment in time than the first moment, the second CR command configured to override the first CR command.

27. The first UE of claim 24, wherein the transceiver is further configured to:
receive, from the second UE, a second CR command to allow the first UE to access a second portion of the communication resources pool,
the second CR command configured to allow the first UE to access a third portion of the communication resources pool; and
the second portion of the communication resources pool being a weighted average of the first portion of the communication resources pool and the third portion of the communication resources pool.

28. The first UE of claim 27, wherein:
the first CR command includes a first time stamp indicating a first moment in time and the second CR command includes a second time stamp indicating a later moment in time than the first moment; and
the weighted average is calculated using a weighting factor for the first portion of the communication resources pool that is greater than a weighting factor for the third portion of the communication resources pool.

29. The first UE of claim 24, wherein the transceiver is further configured to receive, from the second UE, a second CR command including a negative CR limit for the first UE configured to prevent the first UE from accessing a CR of the first UE.

30. The first UE of claim 24, wherein the first CR command is configured to allow the first UE to access the first portion of the communication resources pool by adjusting a CR limit of the first UE.

* * * * *